(12) United States Patent
Sekiguchi

(10) Patent No.: US 7,489,381 B2
(45) Date of Patent: Feb. 10, 2009

(54) LIQUID-CRYSTAL OPTICAL ELEMENT, CAMERA USING THE SAME, AND OPTICAL PICKUP DEVICE USING THE SAME

(75) Inventor: Kanetaka Sekiguchi, Sayama (JP)

(73) Assignee: Citizen Holdings Co., Ltd., Tokyo (JP)

( * ) Notice: Subject to any disclaimer, the term of this patent is extended or adjusted under 35 U.S.C. 154(b) by 229 days.

(21) Appl. No.: 11/642,853

(22) Filed: Dec. 21, 2006

(65) Prior Publication Data

US 2008/0151168 A1    Jun. 26, 2008

(51) Int. Cl.
*G02F 1/1343* (2006.01)
(52) U.S. Cl. ..................... 349/142; 349/139
(58) Field of Classification Search .......... 349/139–148
See application file for complete search history.

(56) References Cited

U.S. PATENT DOCUMENTS 6,909,686 B2    6/2005   Iwasaki et al.

2005/0207290 A1    9/2005   Iwasaki et al.

FOREIGN PATENT DOCUMENTS

JP    2001-176108    6/2001

*Primary Examiner*—Kevin S Wood
(74) *Attorney, Agent, or Firm*—Smith, Gambrell & Russell, LLP

(57) ABSTRACT

A liquid-crystal optical element comprises a plurality of wiring electrodes formed between a plurality of segment electrodes and a lower transparent substrate and connected electrically to the segment electrodes, individually, and a plurality of contact electrodes connected to the segment electrodes and the corresponding wiring electrodes. The adjacent segment electrodes are different in height position above the lower transparent substrate. A contact electrode that is connected to that one of each two adjacent segment electrodes which is situated on the side of a liquid crystal layer is connected to the destination segment electrode inside its edge, when viewed along a section formed by cutting the segment electrode in the direction perpendicular to the planes of the lower and an upper transparent substrate.

12 Claims, 18 Drawing Sheets

LIQUID-CRYSTAL OPTICAL ELEMENT, CAMERA USING THE SAME, AND OPTICAL PICKUP DEVICE USING THE SAME

BACKGROUND OF THE INVENTION

1. Field of the Invention

The present invention relates to a liquid-crystal optical element used as an aberration correcting optical element for aberration correction for information recording and reproduction using an information recording medium, such as a variable-focus lens of a digital camera, optical disc, etc., a camera using the liquid-crystal optical element as a lens, and an optical pickup device using the liquid-crystal optical element.

2. Description of the Related Art

A conventionally known liquid-crystal optical element, such as the one shown in FIGS. 19A and 19B, is used as an aberration correcting optical element for aberration correction for information recording and reproduction using an information recording medium, such as a variable-focus lens of a digital camera, optical disc, etc.

FIGS. 19A and 19B are a plan view and a sectional view, respectively, showing principal electrodes of the liquid-crystal optical element. A liquid crystal layer 11 is sandwiched between an upper glass 12 and a lower glass 10. A whole-surface electrode 132 is provided on the upper glass 12, while a plurality of transparent electrodes 120, 122 and 124 are arranged concentrically on the lower glass 10. In this liquid-crystal optical element, voltage applied to the concentric transparent electrode group is changed to differentiate the respective optical refractive indexes of the affected parts of the liquid crystal layer 11. Thus, the liquid-crystal optical element is used as a variable-focus lens or an aberration correcting optical element.

In the liquid-crystal optical element described above, as shown in FIG. 19A, however, the ring-shaped segment electrodes 120, 122 and 124 that are arranged concentrically constitute one transparent electrode layer. Therefore, it is necessary to provide clearances 126 and 128 between the ring-shaped segment electrodes and draw out a wire group 130 for connection with a drive section to a glass end portion. Thus, if the liquid-crystal optical element is used as a camera lens, image distortion is caused in regions corresponding to the clearances 126 and 128 and the wire group 130. If the optical element is used as an aberration correcting optical element, on the other hand, an information recording or reproduction error is inevitably caused owing to a failure of aberration correction. These problems have become serious with the increase of the number of pixels of digital cameras and the density of information recording media.

In an example of the liquid-crystal optical element for aberration correction (e.g., Japanese Paten Application Laid-Open No. 2001-176108), therefore, two transparent electrode layers are arranged such that a first one of them is provided with a group of first ring-shaped segment electrodes arranged concentrically, and a second layer with a group of second ring-shaped segment electrodes that fill clearances between the first segment electrodes. In this example, the same driving voltage for the first segment electrodes that adjoin the second segment electrodes for clearance fulfillment in plan is applied to the second segment electrodes. By doing this, the accuracy of aberration correction in the clearances 126 and 128 between the concentric segment electrodes shown in FIG. 19A is improved.

Even in this example, however, the wire group 130 for connection shown in FIG. 19A cannot achieve aberration correction, and the problem of image distortion still remains. In consequence, this example cannot display its properties as an aberration correcting optical element for high-density information recording media or as a digital camera lens.

SUMMARY OF THE INVENTION

The present invention has been made in consideration of the aforementioned problems of the prior art, and its object is to provide a liquid-crystal optical element, capable of eliminating image distortion when used as a variable-focus liquid crystal lens or of improving aberration correction accuracy when used for aberration correction, a camera using the same, and an optical pickup device using the same.

An liquid-crystal optical element according to the first aspect of the present invention comprises: a first transparent substrate; a second transparent substrate which is located opposite the first transparent substrate with a gap left between the first and second transparent substrates; a liquid crystal layer provided between the first and second transparent substrates; a plurality of wiring electrodes located in a position at a first height above the first transparent substrate; a first group of segment electrodes located in a position at a second height greater than the first height above the first transparent substrate; a second group of segment electrodes located in a position at a third height greater than the second height above the first transparent substrate; and contact electrodes which connect, in their contact portions, the individual segment electrodes belonging to the first and second segment electrode groups and the wiring electrodes corresponding thereto. Each of the first and second segment electrode groups is formed of a plurality of concentrically arranged ring-shaped segment electrodes such that one segment electrode belonging to the first segment electrode group adjoins one segment electrode belonging to the second segment electrode group, and the contact electrodes are distributed over the first transparent substrate without being concentrated on one straight line when viewed in the direction perpendicular to the planes of the transparent substrates.

The segment electrodes belonging to the second segment electrode group may be connected to the contact electrodes in positions inside the edges of the segment electrodes.

An insulating layer may be provided in a center space of the ring-shaped segment electrode belonging to the first segment electrode group, and the thickness of the insulating layer may be not less than twice that of the segment electrode. The insulating layer may be formed of a plastic film. The first transparent substrate may have alignment marks of the same shape formed in the same position using at least two of the layers of the first and second segment electrode groups and the insulating layer.

At least one of the first and second transparent substrates may be substantially circular.

A first insulating layer may be formed between the wiring electrodes and the first segment electrode group, a second insulating layer may be formed between the first and second segment electrode groups, and an opening may be formed in that part of the second insulating layer which corresponds to each said contact portion, and the area of the opening may be not less than 1.4 times as large as the area of an opening formed in that part of the first insulating layer which corresponds to each said contact portion.

One of the two adjacent segment electrodes, situated on the first transparent substrate side, may be formed having a recess in a part of an edge thereof when viewed in the direction perpendicular to the planes of the first and second transparent substrates. The two adjacent ring-shaped segment electrodes may be arranged so that there is no planar clearance therebetween.

An liquid-crystal optical element according to the first aspect of the present invention comprises: a first transparent substrate; a second transparent substrate which is located opposite the first transparent substrate with a gap left between the first and second transparent substrates; a liquid crystal layer provided between the first and second transparent substrates; a plurality of wiring electrodes located in a position at a first height above the first transparent substrate; a plurality of ring-shaped segment electrodes arranged concentrically between the liquid crystal layer and the first transparent substrate; and contact electrodes which connect the individual segment electrodes and the wiring electrodes corresponding thereto in their contact portions. A central segment electrode, among the ring-shaped segment electrodes, is situated in the lowest or highest position above the first transparent substrate so that the segment electrodes situated farther from the central segment electrode are higher or lower above the first transparent substrate, whereby the thickness of the liquid crystal layer is maximized or minimized in the center so that the thickness is gradually reduced or increased from the center toward the outer periphery, and the contact electrodes are distributed over the first transparent substrate without being concentrated on one straight line when viewed in the direction perpendicular to the plane of the first transparent substrate.

A camera according to the invention uses the liquid-crystal optical element described above.

An optical pickup device comprises the liquid-crystal optical element.

According to the present invention, a contact electrode that is connected to that one of each two adjacent segment electrodes which is situated on the liquid crystal layer side is connected to the destination segment electrode inside its edge, whereby insulation between the contact electrode and the segment electrode can be facilitated.

Further, the wiring electrodes that are connected electrically to the segment electrodes, individually, are formed between the first transparent substrate and the segment electrodes, and the segment electrodes and their corresponding wiring electrodes are connected to one another by the contact electrodes. Thus, image distortion or aberration correction errors, which are attributable to clearances between the concentric segment electrodes, and wiring regions can be removed. In consequence, a liquid crystal lens of a zoom-type multi-pixel digital camera and an optical pickup device for high-density recording media based on a blue laser can enjoy a practicable-level quality for the first time.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A liquid-crystal optical element according to a first embodiment of the present invention will be described with reference to FIGS. 1A to 5.

Figure 1A:
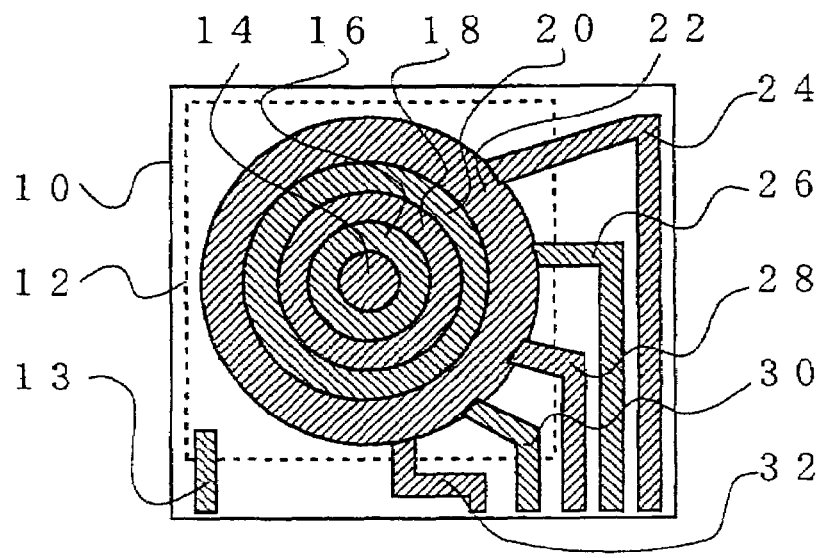
FIGS. 1A and 1B are plan views showing an outline of an liquid-crystal optical element according to a first embodiment of the invention.

As shown in FIG. 1A, concentrically arranged ring-shaped segment electrodes 14, 16, 18, 20 and 22 and wiring electrodes 24, 26, 28, 30 and 32 that apply driving signals to the segment electrodes are formed on a larger transparent substrate 10 that constitutes the liquid-crystal optical element. Each ring-shaped segment electrode is connected to its corresponding wiring electrode in a contact portion (mentioned later). The segment electrodes 14, 16, 18, 20 and 22 are arranged without clearances when viewed in the direction perpendicular to the planes of the transparent substrates 10 and 12. Also formed is a common terminal electrode 13 for applying a driving signal to an electrode on the smaller transparent substrate 12.

Figure 1B:
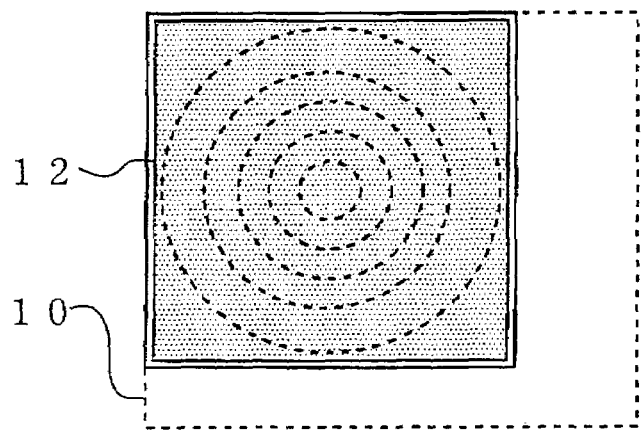

As shown in FIG. 1B, a transparent electrode is formed on the whole surface of the smaller transparent substrate 12 that constitutes the liquid-crystal optical element. The driving signal from the common terminal electrode 13 shown in FIG. 1A is applied to the transparent electrode (not shown) through a sealing portion, which will be mentioned later.

Figure 1C:
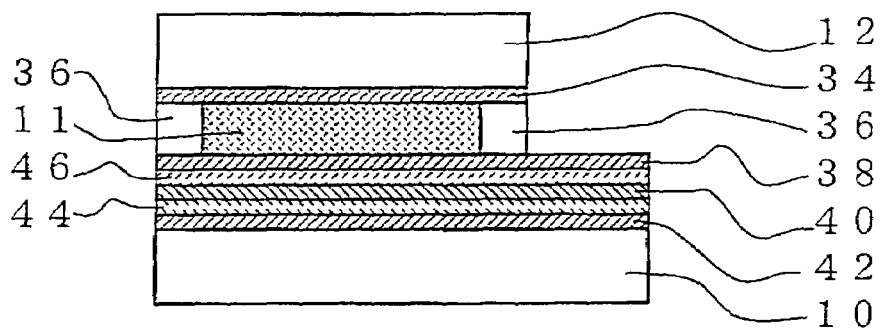
FIG. 1C is a sectional view of the liquid-crystal optical element.

FIG. 1C is a sectional view of the liquid-crystal optical element according to the present invention. A wholly transparent substrate 34 is formed on the smaller upper transparent substrate 12. A first transparent electrode layer 42 is formed on the larger lower transparent substrate 10. A second transparent electrode layer 40 is formed on the first transparent electrode layer 42, and a third transparent electrode layer 38 on the second transparent electrode layer 40. A first insulating layer 44 is sandwiched between the first and second transparent electrode layers 42 and 40, and a second insulating layer 46 between the second and third transparent electrode layers 40 and 38.

The upper and lower transparent substrates 12 and 10 on which the transparent electrode layers are formed are bonded together by a sealing portion 36, and a liquid crystal layer 11 is sealed in a space that is defined by the upper and lower transparent substrates 12 and 10 and the sealing portion 36.

Odd-number electrodes (e.g., segment electrodes 14, 18 and 22), among the ring-shaped segment electrodes 14, 16, 18, 20 and 22 that are arranged concentrically, are arranged on the third transparent electrode layer 38, even-number electrodes (e.g., segment electrodes 16 and 20) are arranged on the second transparent electrode layer 40, and the wiring electrodes 24, 26, 28, 30 and 32 are arranged on the third transparent electrode layer 38. By doing this, planar clearances between the segment electrodes can be eliminated, and their influence on the liquid-crystal optical element can be removed.

Thus, according to the liquid-crystal optical element of the present embodiment, the whole surface of the liquid-crystal optical element can be substantially covered by the segment electrodes 14, 16, 18, 20 and 22 that are ring-shaped in plan. Accordingly, the entire liquid crystal layer 11 is controlled by applied voltage from the ring-shaped segment electrodes. If this liquid-crystal optical element is used as a camera lens, therefore, it can remove distortion (asymmetry) of an image. If it is used as an aberration correcting optical element, moreover, it can eliminate the possibility of an information recording or reproduction error that is attributable to a failure of aberration correction.

The number of ring-shaped segment electrodes that are arranged concentrically is expected only to be adjusted to required characteristics of the desired lens or the aberration correcting element.

Figure 2A:
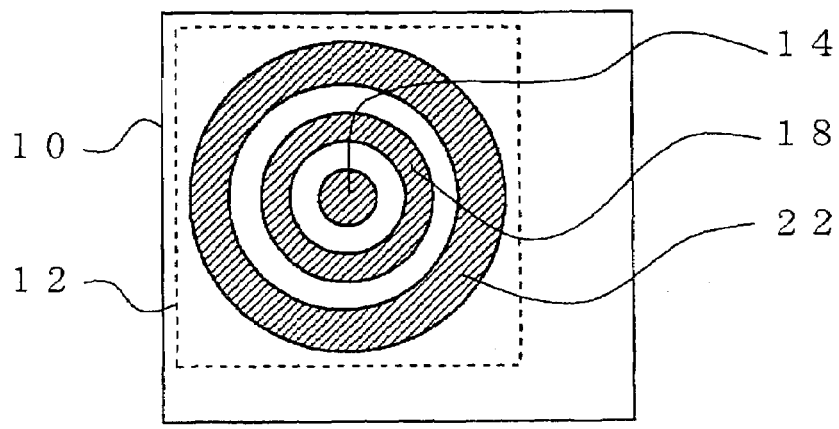
FIGS. 2A and 2B are views showing segment electrodes formed individually on third and second transparent electrode layers of the liquid-crystal optical element shown in FIGS. 1A to 1C.
Figure 2B:
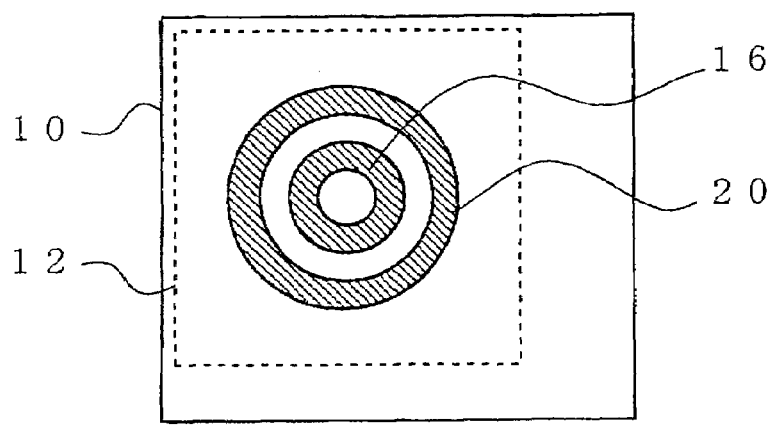

FIG. 2A shows that an electrode pattern for the odd-number segment electrodes 14, 18 and 22, among the ring-shaped segment electrodes 14, 16, 18, 20 and 22 that are arranged concentrically, is formed on the third transparent electrode layer 38. FIG. 2B shows that an electrode pattern for the even-number segment electrodes 16 and 20 is formed on the second transparent electrode layer 40. Specifically, one of each two adjacent segment electrodes is located on the second transparent electrode layer 40, and the other on the third transparent electrode layer 38.

Figure 2C:
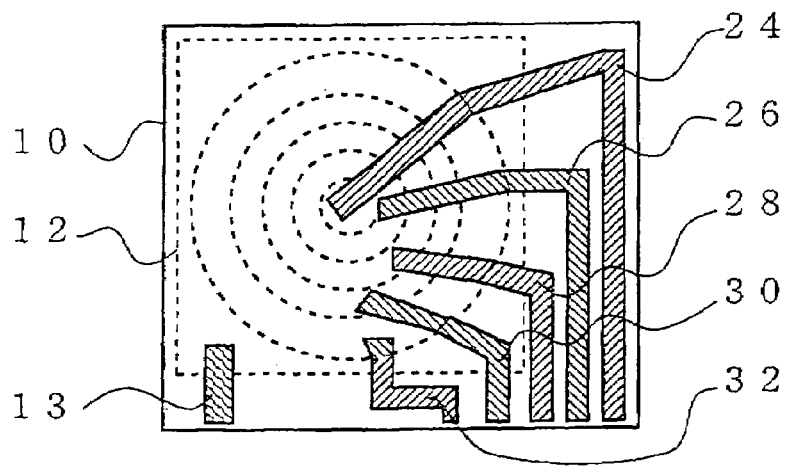
FIG. 2C is a view showing wiring electrodes formed on a first transparent electrode layer of the liquid-crystal optical element.

FIG. 2C shows that an electrode pattern for the wiring electrodes 24, 26, 28, 30 and 32 is formed on the first transparent electrode layer 42. As seen from FIG. 2C, the wiring electrodes 24, 26, 28, 30 and 32 are provided corresponding to the concentrically arranged ring-shaped segment electrodes 14, 16, 18, 20 and 22, respectively. Further, the common terminal electrode 13 for connection with the wholly transparent substrate 34 (see FIG. 1B) on the smaller transparent substrate 12 is provided on the first transparent electrode layer 42.

Thus, the odd- and even-number ring-shaped segment electrode groups, among the segment electrode groups that are arranged concentrically, and the wiring electrode group are formed separately on the three different layers, so that the adjacent electrodes can be prevented from being electrically shorted. Further, the whole surface of the liquid-crystal optical element can be substantially covered without clearances by the ring-shaped electrodes that are arranged concentrically, when viewed in the direction perpendicular to the planes of the transparent substrates 10 and 12.

A sectional shape of the liquid-crystal optical element according to this embodiment will be described with reference to FIG. 3. This figure is a detailed version of FIG. 1C. For ease of illustration, the wiring electrodes 24 and 30 corresponding individually to the ring-shaped segment electrodes 14 and 20 are shown in FIG. 3.

Figure 3:
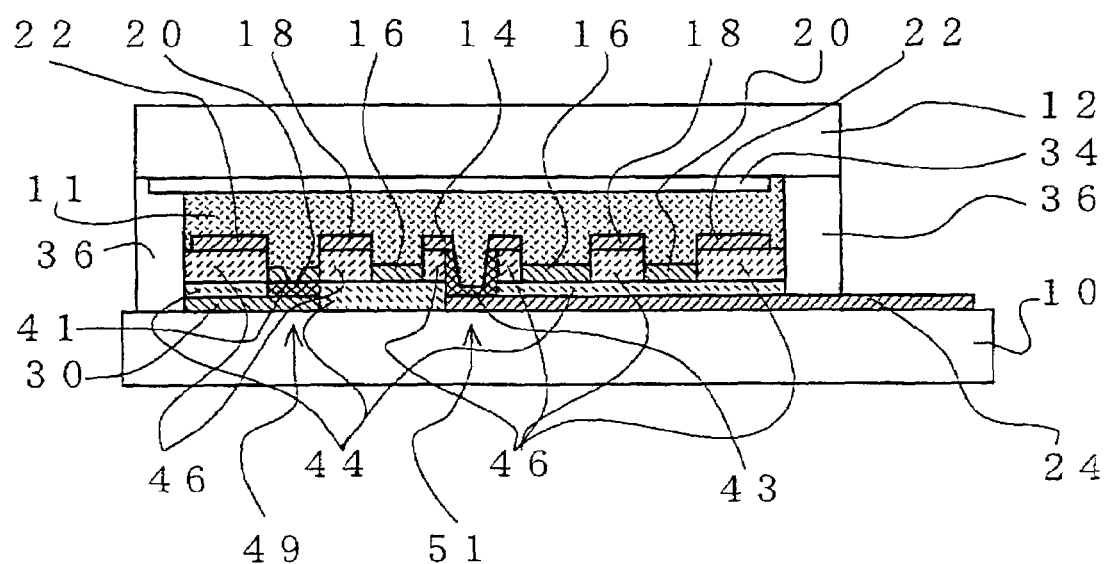
FIG. 3 is a sectional view of the liquid-crystal optical element shown in FIGS. 1A to 1C.

In FIG. 3, the wiring electrodes 24 and 30 belong to the first transparent electrode layer 42 of FIG. 1C, the (even-number) segment electrodes 16 and 20 belong to the second transparent electrode layer 40, and the (odd-number) segment electrodes 14, 18 and 22 belong to the third transparent electrode layer 38. The first and second transparent electrode layers 42 and 40 are insulated from each other by the first insulating layer 44, while the second and third transparent electrode layers 40 and 38 are insulated from each other by the second insulating layer 46.

In a contact portion 49, the first insulating layer 44 is provided with an opening, in which the segment electrode 20 of the second transparent electrode layer 40 and the segment electrode 30 of the first transparent electrode layer 42 are connected electrically to each other by a contact electrode 41. In another contact portion 51, on the other hand, the first and second insulating layers 44 and 46 are provided with openings, individually, in which the segment electrode 14 of the third transparent electrode layer 38 and the wiring electrode 24 of the first transparent electrode layer 42 are connected electrically to each other by a contact electrode 43.

As shown in the sectional view of FIG. 3, each two adjacent segment electrodes are arranged without any planar clearance between them. Since each two are located individually on different transparent electrode layers (i.e., one on the second transparent electrode layer 40 and the other on the third transparent electrode layer 38), moreover, the clearances between the segment electrodes can be eliminated without causing electrical short-circuiting.

Since the segment electrodes that are arranged concentrically exist between the liquid crystal layer 11 and the wiring electrodes 24 and 30, furthermore, electric fields of the wiring electrodes never influence the liquid crystal layer 11.

A construction method for the sectional views herein and structures of the contact portions will now be described with reference to FIGS. 4A to 4C.

Figure 4A:
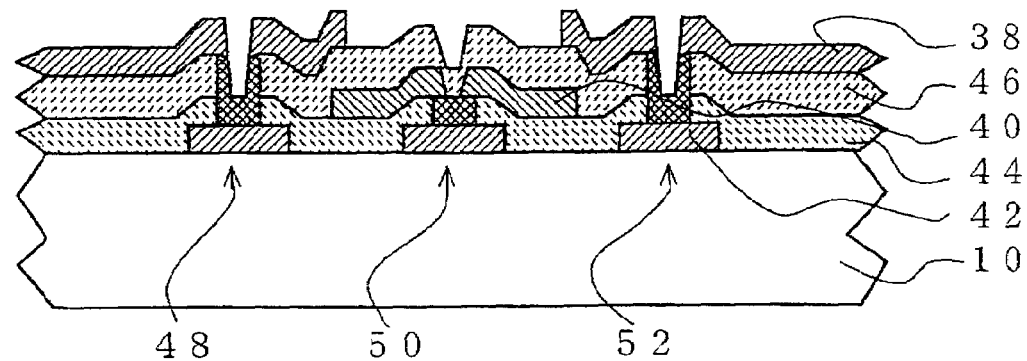
FIGS. 4A, 4B and 4C are views for illustrating a construction method for the sectional views of the liquid-crystal optical element shown in FIGS. 1A to 1C.

FIG. 4A is a sectional view relatively accurately depicting how the upper transparent substrate or the insulating layer swells under the influence of the lower transparent electrode or the insulating layer. On the other hand, FIG. 4B is a sectional view that is depicted with the influence of the lower transparent electrode or the insulating layer ignored to simplify the illustration.

Figure 4B:
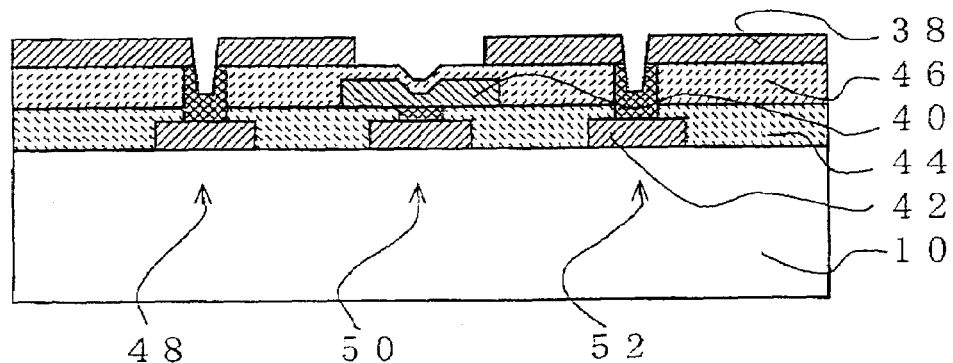

Although the illustration of contact portions 48, 50 and 52 is complicated according to the construction method shown in FIG. 4A, it can be simplified according to the construction method shown in FIG. 4B. The simplified construction method shown in FIG. 4B is adopted for the drawings herein.

Figure 4C:
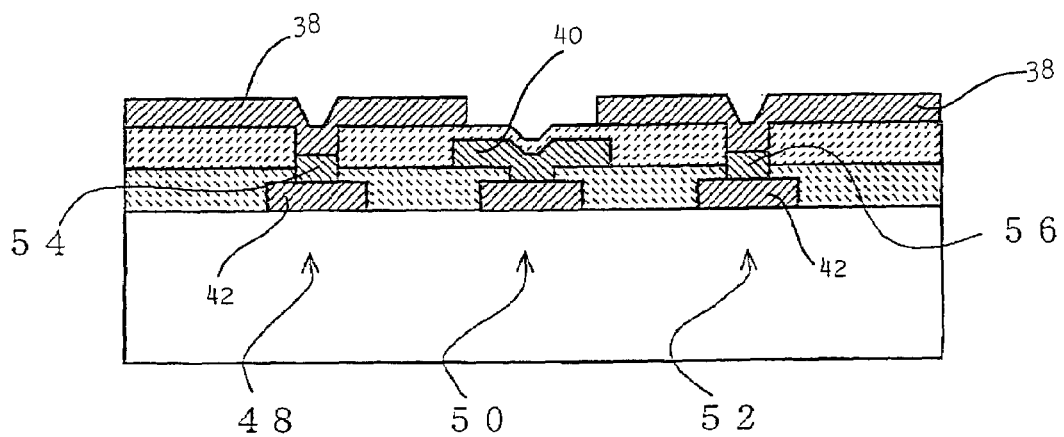

FIG. 4C is a view showing a formation method separate from the one for the contact portions 48, 50 and 52 shown in FIG. 4A.

In making contact between the third and first transparent electrode layers 38 and 42 in the examples of FIGS. 4A and 4B, the third transparent electrode layer 38 is connected directly to the first transparent electrode layer 42 through transparent conductors that form the third transparent electrode layer 38, when the third transparent electrode layer 38 is formed.

In the example of FIG. 4C, however, contact openings are stuffed with transparent conductors 54 and 56 of the second transparent electrode layer 40. Thereafter, the third and first transparent electrode layers 38 and 42 are connected to each other through the transparent conductors 54 and 56. Specifically, a contact electrode that electrically connects the first and third transparent electrode layers 42 and 38 is composed of both the second and third transparent electrode layers 40 and 38. According to the method of FIG. 4C, the depression of the contact portions can be lessened, so that the possibility of disconnection and the influence of the depression on the liquid crystal layer can be reduced.

Figure 5:
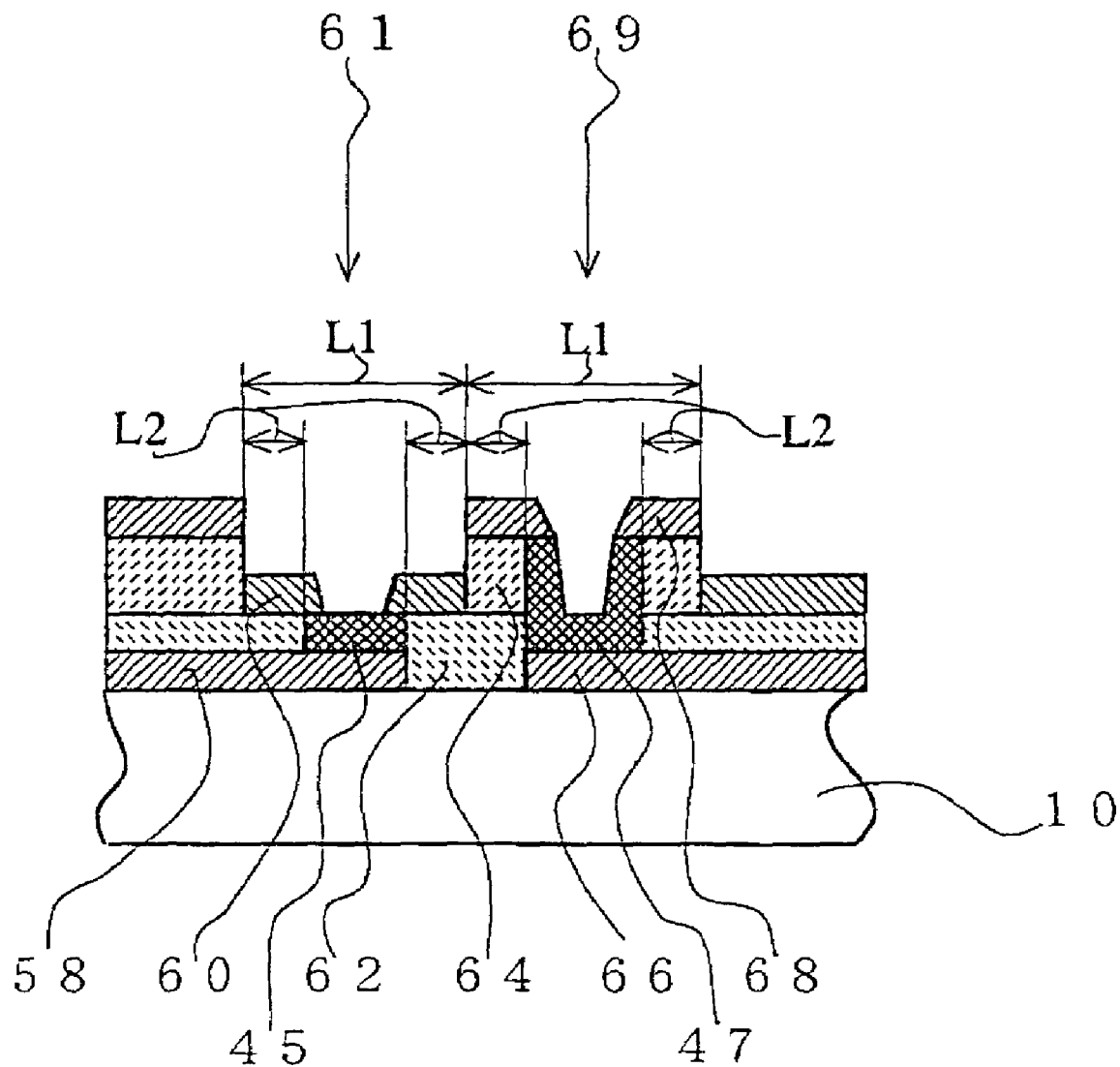
FIG. 5 is an enlarged view of the liquid-crystal optical element shown in FIGS. 1A to 1C.

FIG. 5 is an enlarged sectional view showing the liquid-crystal optical element according to the present embodiment.

In FIG. 5, ring-shaped segment electrodes 60 and 68 are arranged adjacent to each other. Out of these segment electrodes, the segment electrode 60 on the second transparent electrode layer 40 is connected electrically to a wiring electrode 58 that is formed on the first transparent electrode layer 42 by a contact electrode 45 in a contact portion 61. On the other hand, the ring-shaped segment electrode 68 on the third transparent electrode layer 38 is connected electrically to a wiring electrode 66 that is formed on the first transparent electrode layer 42 by a contact electrode 47 in a contact portion 69.

Since the adjacent segment electrodes 60 and 68 belong individually to different transparent electrode layers (i.e., one to the second transparent electrode layer and the other to the third transparent electrode layer), moreover, their respective heights above the transparent substrate 10 are different. The contact electrode 47 that is connected to the segment electrode 68 situated on the side of the liquid crystal layer 11 (or formed on the third transparent electrode layer 38) is connected to the electrode 68 inside an edge of the electrode 68 (in a position recessed by a margin L2 shown in FIG. 5), as viewed along a section obtained by cutting the segment electrodes 60 and 68 in the normal direction of the transparent substrates 10 and 12.

Further, the two adjacent segment electrodes 60 and 68 are provided on different planes (or on the second and third transparent electrode layers), and the wiring electrodes 58 and 66 are provided on a plane (or on the first transparent electrode layer) that is different from the planes for the electrodes 60 and 68.

With this arrangement, the two adjacent segment electrodes 60 and 68 can be prevented from being electrically shorted, though they are arranged without a clearance as viewed in the normal direction of the transparent substrates 10 and 12.

Since the contact electrodes 45 and 47 are thus connected to the segment electrodes 60 and 68, respectively, inside the edges thereof, the contact electrodes can be easily insulated from the segment electrodes.

Since the two adjacent electrodes are located on the different planes, moreover, the whole surface of the liquid-crystal optical element can be substantially covered by the ring-shaped segment electrodes, when viewed in the direction perpendicular to the planes of the transparent substrates 10 and 12, without causing electrical short-circuiting between the segment electrodes.

Since the wiring electrodes are located on the plane (layer) that is different from the two different plane (layers) on which the segment electrodes are located, furthermore, they can be also prevented from distorting the planar shapes of the ring-shaped segment electrodes that are arranged concentrically. If the liquid-crystal optical element is used as a camera lens, therefore, it can remove distortion (asymmetry) of an image. If it is used as an aberration correcting optical element, moreover, it can eliminate the possibility of an information recording or reproduction error that is attributable to a failure of aberration correction.

Thus, according to the liquid-crystal optical element of the present embodiment, a camera lens that is free from image distortion can be realized based on the liquid-crystal optical element. Since the lens based on the liquid-crystal optical element can be changed in focal distance depending on voltage applied to the liquid crystal layer, it is much more effective than a conventional zoom mechanism based on mechanical means in speed-up of operation, miniaturization, weight reduction, and price reduction.

A liquid-crystal optical element according to a second embodiment of the present invention will be described with reference to FIGS. 6A and 6B.

Figure 6A:
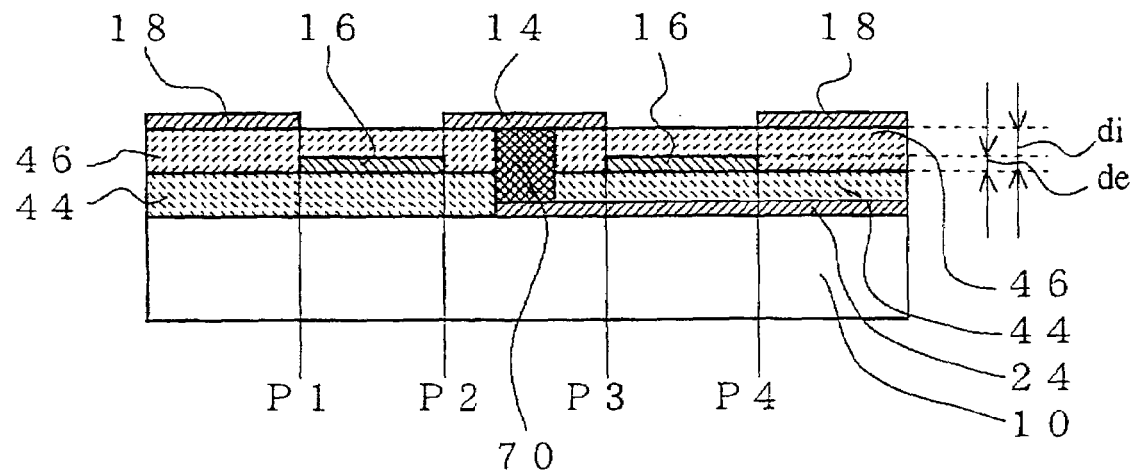
FIGS. 6A and 6B are sectional views of a liquid-crystal optical element according to a second embodiment of the invention.

As shown in FIG. 6A, a first insulating layer 44 is provided on a wiring electrode 24 on a first transparent electrode layer, while a second insulating layer 46 is provided on a segment electrode 16 on a second transparent electrode layer and in a center space of the segment electrode 16. Ring-shaped segment electrodes 14 and 18 on a third transparent electrode layer are located on an uppermost layer, and a transparent conductor 70 is formed in a contact portion between the wiring electrode 24 and the segment electrode 14.

The present embodiment is characterized in that the second insulating layer 46 is left on the segment electrode 16 on the second transparent electrode layer. By thus leaving the insulating layer on the segment electrode on the second transparent electrode layer, a step of removing the second insulating layer 46 can be omitted, so that processes can be simplified.

If the insulating layer is left in this manner, on the other hand, the voltage applied to the liquid crystal layer is reduced. In the liquid-crystal optical element according to the present embodiment, however, driving voltages can be applied individually to a plurality of ring-shaped segment electrodes that are arranged concentrically, as described above with reference to FIG. 1. Thus, the influence of the insulating layers that are located on the segment electrodes can be removed, so that there is no problem of reduction of the voltage applied to the liquid crystal layer.

Figure 6B:
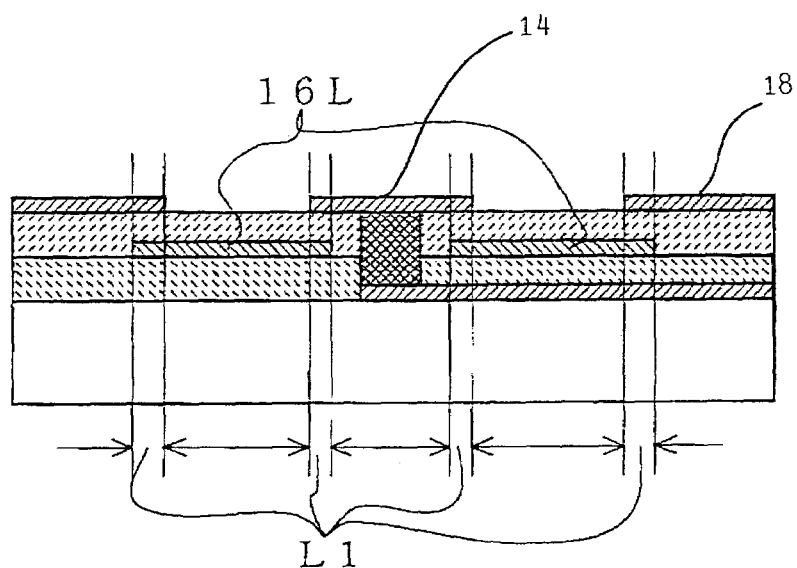

The arrangement shown in FIG. 6B differs from the arrangement shown in FIG. 6A only in the size of the segment electrode 16 on the second transparent electrode layer. In FIG. 6A, the ring-shaped segment electrodes 14, 16 and 18 are configured so that the adjacent segment electrodes are seemingly in contact with one another in positions P1, P2, P3 and P4 shown in FIG. 6A, when viewed in the direction perpendicular to the planes of the transparent substrates 10 and 12. In FIG. 6B, on the other hand, a segment electrode 16L that is located on the second transparent electrode layer is made larger so that each of the segment electrodes 14 and 18 on one side (or on the third transparent electrode layer)

overlaps the segment electrode 16L on the other side (or on the second transparent electrode layer) by a width L1 as shown in FIG. 6B.

Thus, by increasing the width of the ring-shaped segment electrodes on the second transparent electrode layer, a clearance can be prevented from being formed between the adjacent segment electrodes, so that the process margin can be increased.

As shown in FIG. 6A, moreover, the second insulating layer 46 is provided in the center space of the ring-shaped segment electrode on the second transparent electrode layer. A thickness di of the second insulating layer 46 is set to be not less than twice a thickness de of the segment electrode 16 on the second transparent electrode layer. Although di is shown to be three times as large as de in FIG. 6A, it may alternatively be set to be, for example, five or ten times as large as de.

Since the insulating layers are made thicker than transparent electrode layers, the segment electrodes located on the second transparent electrode layer and the segment electrodes on the third transparent electrode layer can be formed in one process, so that processes can be simplified.

A liquid-crystal optical element according to a third embodiment of the present invention will be described with reference to FIGS. 7A to 7E.

In the present embodiment, as shown in FIGS. 7A to 7E, insulating layers are made thicker than transparent electrode layers, as in the case of the second embodiment shown in FIGS. 6A and 6B.

Figure 7A:
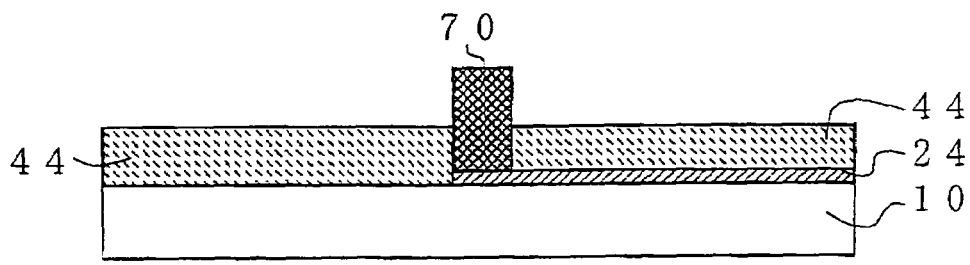
FIGS. 7A, 7B, 7C, 7D and 7E are process diagrams showing manufacturing processes for a liquid-crystal optical element according to a third embodiment of the invention.

FIG. 7A is a sectional view in which a wiring electrode 24 (first transparent electrode layer), a first insulating layer 44, and a transparent conductor 70 in a contact portion are formed on a transparent substrate 10.

In conventional processes, a second transparent electrode layer is formed subsequent to the process of FIG. 7A, and thereafter, the second transparent electrode layer is patterned by etching. In the manufacture of the liquid-crystal optical element according to the present embodiment, however, a second insulating layer 46 is formed in the manner shown in FIG. 7B.

Figure 7B:
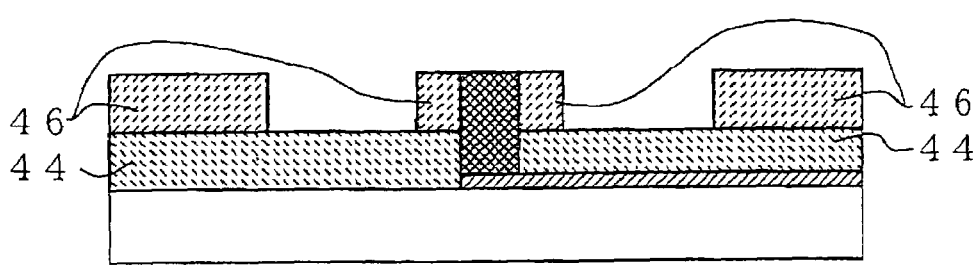
Figure 7C:
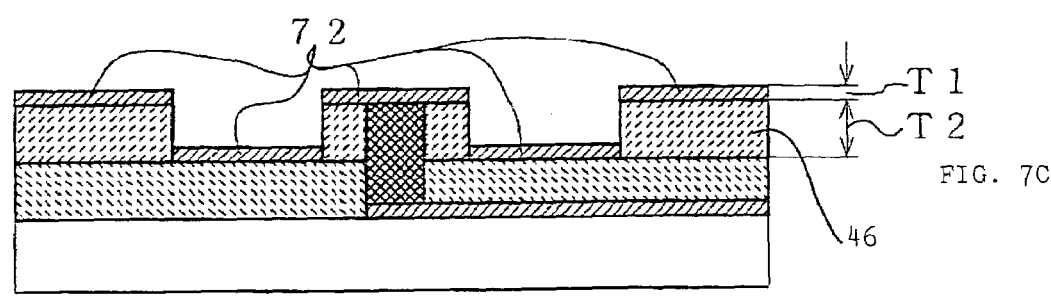

Then, as shown in FIG. 7C, adjacent ring-shaped segment electrodes are formed at a time by a deposition method, such as sputtering deposition or vacuum vapor deposition. In doing this, electrical short-circuiting cannot be caused, since a thickness T2 of the second insulating layer 46 is greater enough than a thickness T1 of each of ring-shaped segment electrodes 72.

Thus, according to the present embodiment, the insulating layers are made thicker enough than the transparent electrode layers. With this arrangement, the segment electrodes arranged concentrically on the second transparent electrode layer and the segment electrodes arranged concentrically on the third transparent electrode layer can be formed in single process, so that processes can be simplified.

Figure 7D:
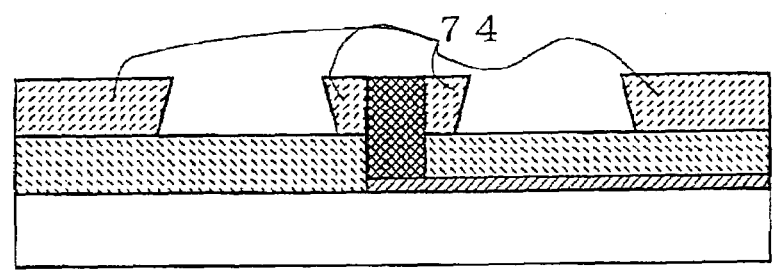

FIG. 7D is a view showing an improved version of the structure shown in FIG. 7B. A second insulating layer 74 is a layer that is inversely tapered as illustrated. This layer can be formed by over-etching based on, for example, the plasma etching method. If two adjacent segment electrodes are formed at a time as in the case of FIG. 7 after the insulating layer is formed in the manner shown in FIG. 7D, transparent electrode layers 72 are formed in the manner shown in FIG. 7E.

Figure 7E:
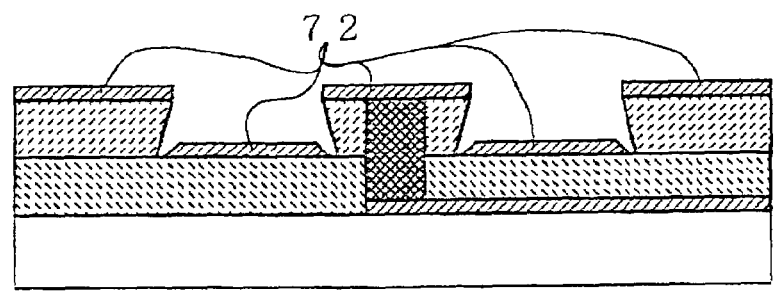

Since the transparent electrode layer 72 of FIG. 7E is inversely tapered, as compared with the tapered second insulating layer 74, there is little chance that the transparent electrode layers 72 be electrically shorted. This example is advantageous in that the two adjacent segment electrodes overlap each other in the manner similar to the case of FIG. 6B.

The respective thicknesses of the wiring electrode that belongs to the first transparent electrode layer and the first insulating layer 44 can be determined suitably as required, since they have no direct connection with any effect of the present embodiment.

A liquid-crystal optical element according to a fourth embodiment of the present invention will be described with reference to FIG. 8.

Figure 8:
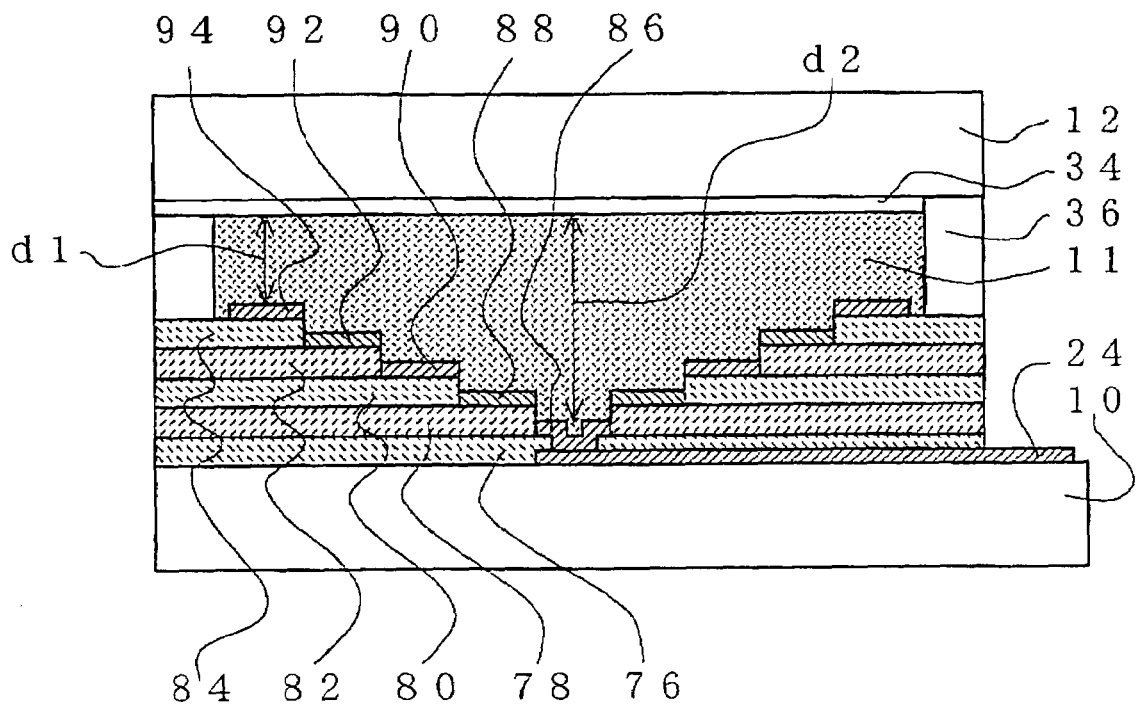
FIG. 8 is a sectional view showing a liquid-crystal optical element according to a fourth embodiment of the invention.

As shown in FIG. 8, a plurality of ring-shaped segment electrodes 86, 88, 90, 92 and 94 are arranged concentrically; the electrode 86 on an insulating layer 76, the electrode 88 on an insulating layer 78, the electrode 90 on an insulating layer 80, the electrode 92 on an insulating layer 82, and the electrode 94 on an insulating layer 84. In the present embodiment, as shown in FIG. 8, the central or first segment electrode 86 is located in a lowermost layer, the second segment electrode 88 (directly outside the electrode 86) in a higher layer, and the third segment electrode 90 (directly outside the electrode 88) in a still higher layer, for example. Thus, the ring-shaped segment electrodes that are situated farther from the center belong to layers in higher positions.

With this arrangement, the width of a clearance for a liquid crystal layer 11 varies with distance from the center, d1 in the position of the ring-shaped segment electrode 94, d2 in the position of the ring-shaped segment electrode 86, and the like. In consequence, a basic constant $\Delta nd$ of the liquid crystal layer corresponding to each segment electrode varies. Although the refractive index or other properties of the liquid crystal layer can be changed with driving voltage to some extent, the range of change is limited. With the configuration shown in FIG. 8, the basic constant $\Delta nd$ of the liquid crystal layer can be changed, so that the range of adjustment can be changed considerably.

As shown in FIG. 8, the ring-shaped segment electrodes that are situated farther from the center belong to the layers in higher positions. Therefore, the farther the position from the center, the smaller the clearance for the liquid crystal layer 11 between each segment electrode and a wholly transparent substrate 34 is. In contrast with this, however, a plurality of ring-shaped segment electrodes may be arranged in each layer so that the farther the position from the center, the larger the clearance for the liquid crystal layer 11 is.

A liquid-crystal optical element according to a fifth embodiment of the present invention will be described with reference to FIG. 9.

Figure 9:
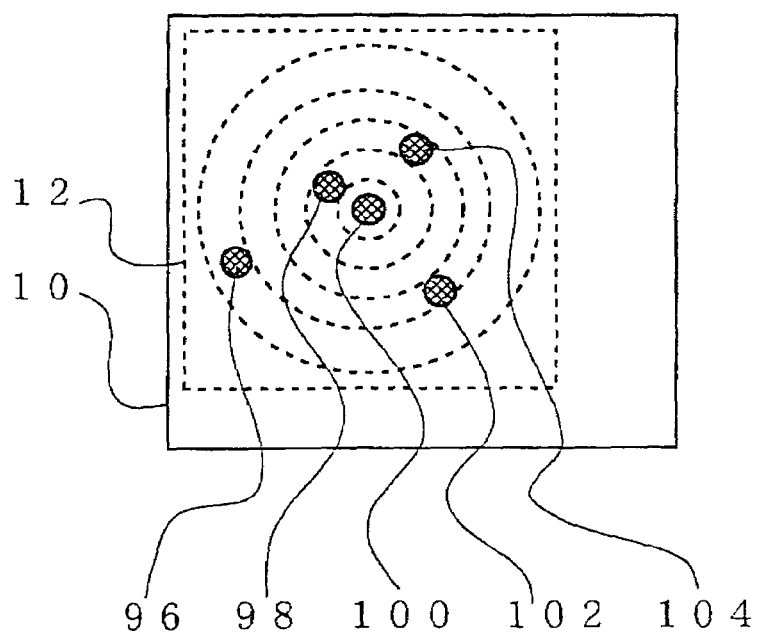
FIG. 9 is a sectional view showing a liquid-crystal optical element according to a fifth embodiment of the invention.

FIG. 9 shows ring-shaped segment electrodes 14, 16, 18, 20 and 22 arranged concentrically, wiring electrodes 24, 26, 28, 30 and 32, and contact portions 100, 98, 104, 102 and 96.

In the present embodiment, as shown in FIG. 9, contact electrodes in the contact portions 100, 98, 104, 102 and 96 are arranged at random in plan. There are some irregularities in the contact portions, and the irregularities influence the optical properties of the liquid crystal layer. If the contact portions are arranged in any specific shape, e.g., linear or circular, they are inevitably recognized as image distortions in case where the optical element is used as camera lens, in particular. If the contact portions 100, 98, 104, 102 and 96 are arranged at random in plan, as in the case of the present invention, however, any distortion of image is not recognized so that a great effect can be produced.

A liquid-crystal optical element according to a sixth embodiment of the present invention will be described with reference to FIGS. 10A and 10B.

Figure 10A:
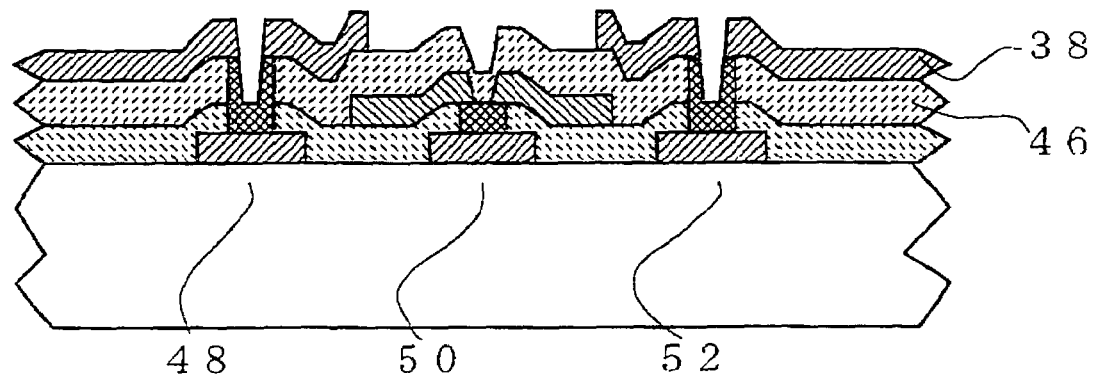
FIG. 10 is a sectional view showing a liquid-crystal optical element according to a sixth embodiment of the invention.

FIG. 10A, which is identical to FIG. 4A, illustrates how irregularities develop on the respective surfaces of contact portions 48, 50 and 52 on the liquid crystal layer side (upper side of FIG. 10A) in the liquid-crystal optical element. If the irregularities develop on the upper surfaces of the contact portions 48, 50 and 52, they inevitably influence the optical properties of the liquid crystal layer.

Figure 10B:
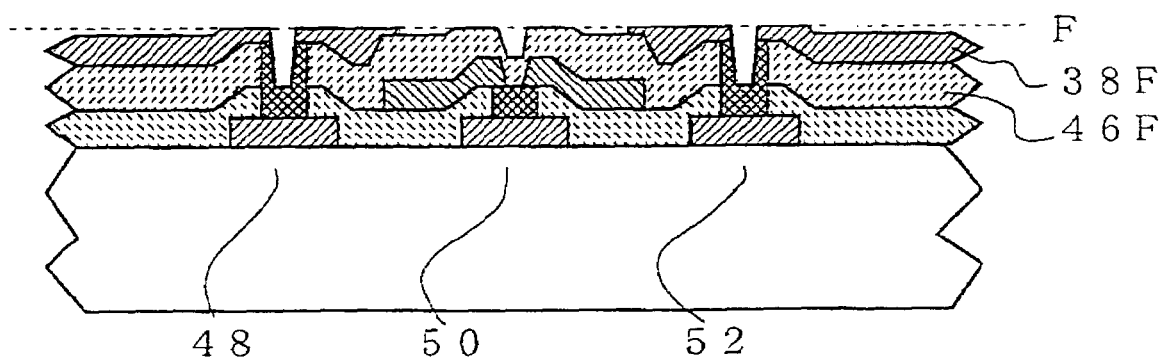

Thereupon, in the present embodiment, a polishing method is used to remove such irregularities to form a flat surface F, as shown in FIG. 10B. In the present embodiment, a third transparent electrode layer 38 having irregularities is leveled off to become a layer 38F, and a second insulating layer 46 having irregularities is leveled off to become a layer 46F, as illustrated in FIG. 10B. This leveling makes the optical properties of the liquid crystal layer uniform, thereby bringing about a great effect.

A liquid-crystal optical element according to a seventh embodiment of the present invention will be described with reference to FIGS. 11A to 11C.

Figure 11A:
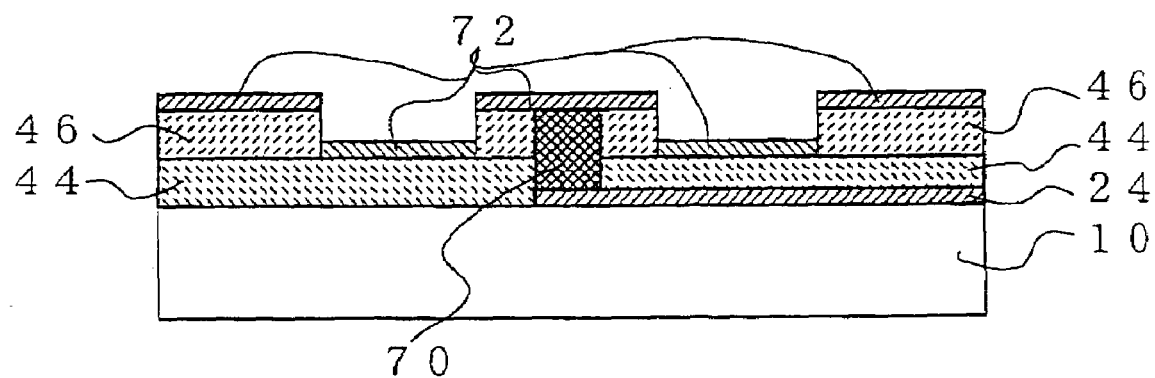
FIG. 11 is a sectional view showing a liquid-crystal optical element according to a seventh embodiment of the invention.

In the present embodiment, as shown in FIG. 11A (identical to FIG. 7A), at least a second insulating layer 46, out of first and second insulating layers 44 and 46, has a thickness twice as large as the thickness of ring-shaped segment electrodes 72.

Figure 11B:
Figure 11C:
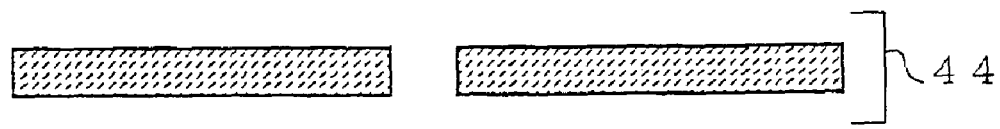

FIGS. 11B and 11C are sectional views of the second and first insulating layers 46 and 44, respectively. At least the second insulating layer 46, out of the first and second insulating layers 44 and 46, is formed of a dielectric transparent film. A plastic film of, e.g., polycarbonate or PES (polyethylene sulfide) is available as this transparent film. If the transparent film is thus used for the insulating layer, it is much more low-priced than the insulating layer that is formed by using a semiconductor manufacturing apparatus, resulting in a great effect.

In general, moreover, an insulating layer that is formed of a transparent film is thicker than a transparent conductor that forms a transparent electrode layer. Therefore, using an insulating layer for a transparent film is adapted for the method in which two adjacent ring-shaped segment electrodes are formed at a time by a deposition method, such as sputtering deposition or vacuum vapor deposition, as shown in FIGS. 7A to 7E.

A liquid-crystal optical element according to an eighth embodiment of the present invention will be described with reference to FIG. 12.

Figure 12:
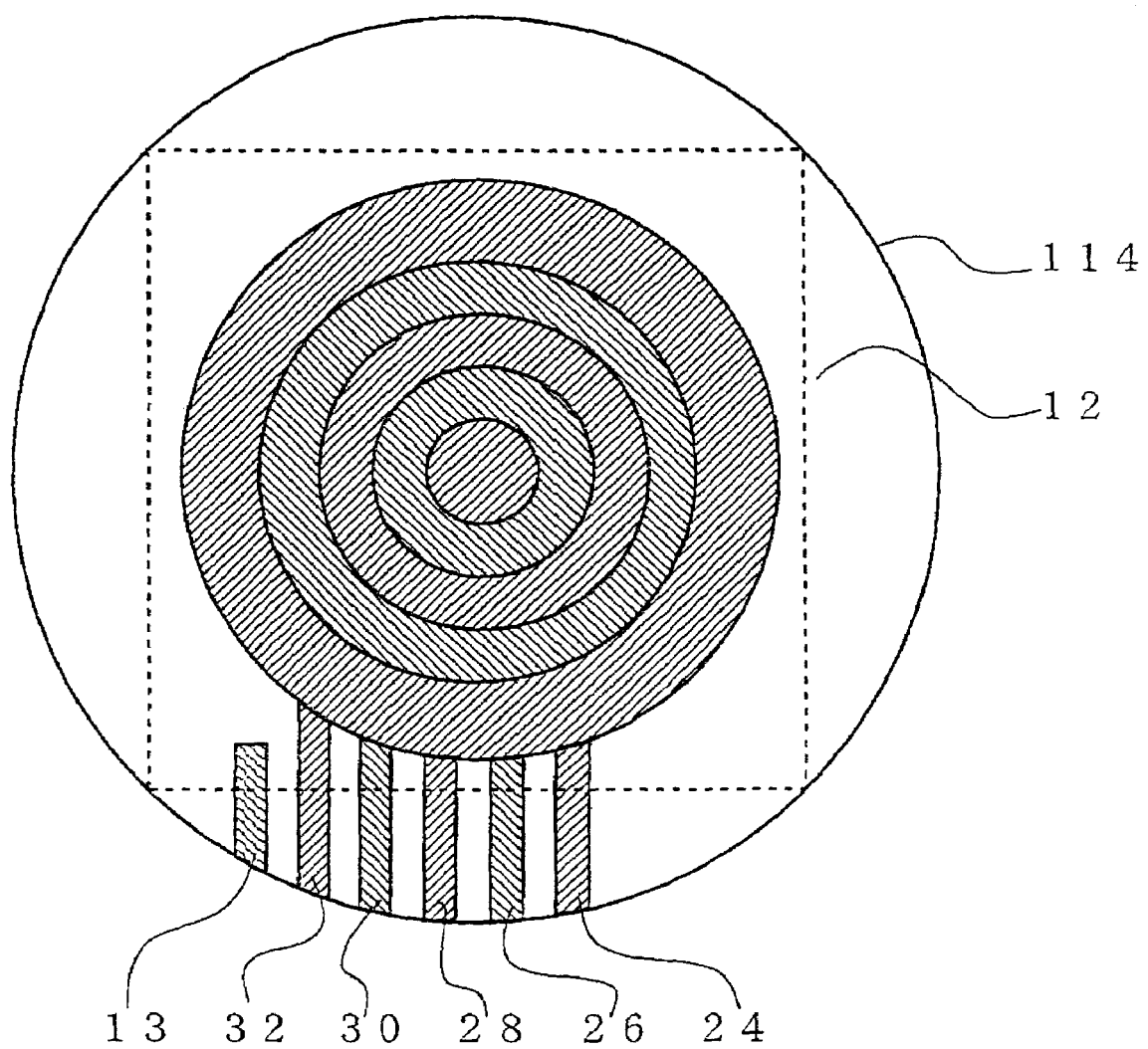
FIG. 12 is a sectional view showing a liquid-crystal optical element according to an eighth embodiment of the invention.

In the present embodiment, as shown in FIG. 12, a smaller transparent substrate 12 is tetragonal, while a larger transparent substrate 10 is substantially circular.

A zoom digital camera usually has a cylindrical lens barrel, and it is both important but difficult to make components easy to be accommodated in the lens barrel and to align their respective optical axes. For these reasons, it is very effective to make the external shape of the liquid-crystal optical element substantially circular.

While the liquid-crystal optical element is only expected to be substantially circular, moreover, the concept of "being substantially circular" implies having the shape of a polygon, such as pentagon, hexagon, heptagon and so on.

In the embodiment shown in FIG. 12, moreover, a smaller transparent substrate remains tetragonal. It is to be understood, however, that an additional effect can be obtained if the smaller transparent substrate is also made substantially circular.

A liquid-crystal optical element according to a ninth embodiment of the present invention will be described with reference to FIGS. 13A and 13B.

Figure 13A:
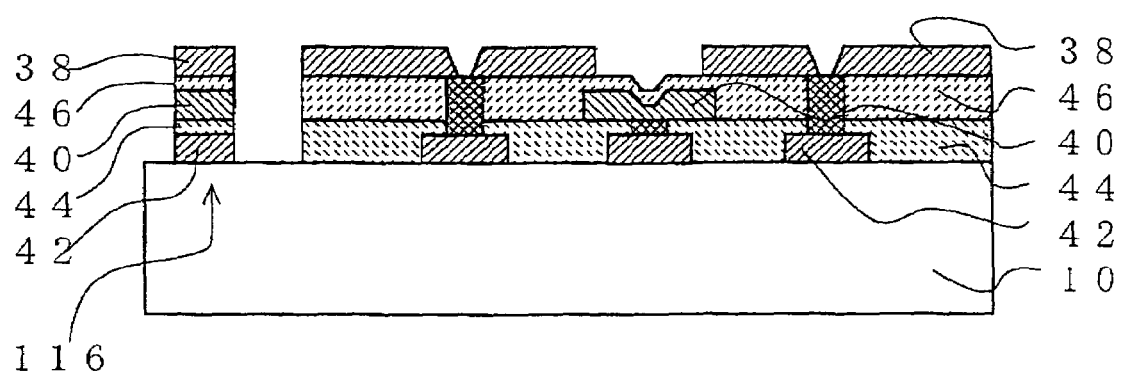
FIG. 13 is a sectional view showing a liquid-crystal optical element according to a ninth embodiment of the invention.
Figure 13B:
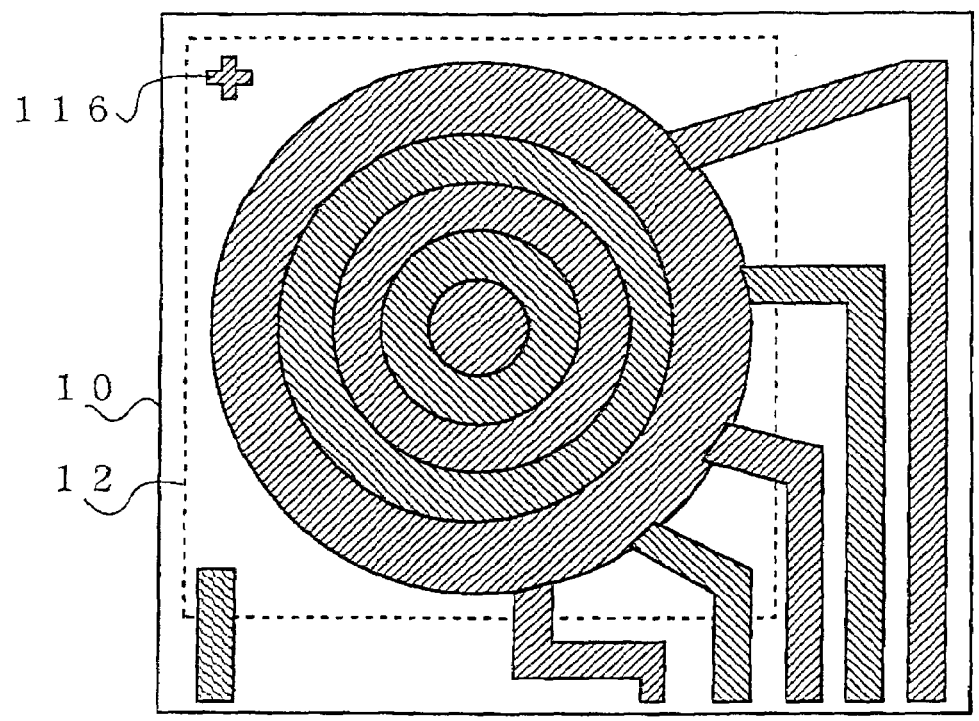

In the present embodiment, as shown in FIG. 13A, an alignment mark 116 is formed on each of layers including a first transparent electrode layer 42, first insulating layer 44, second transparent electrode layer 40, second insulating layer 46, and third transparent electrode layer 38. With use of the alignment mark 116 formed in this manner, the optical refractive index, light transmittance, etc. in the region of the mark 116 change considerably, so that the mark 116 is easily visible.

Thus, in the present embodiment, alignment marks of the same shape are formed in the corresponding positions in at least two of a plurality of transparent electrode layers or insulators, so that they can be detected with ease.

A liquid-crystal optical element according to a tenth embodiment of the present invention will be described with reference to FIGS. 14A and 14B.

Figure 14A:
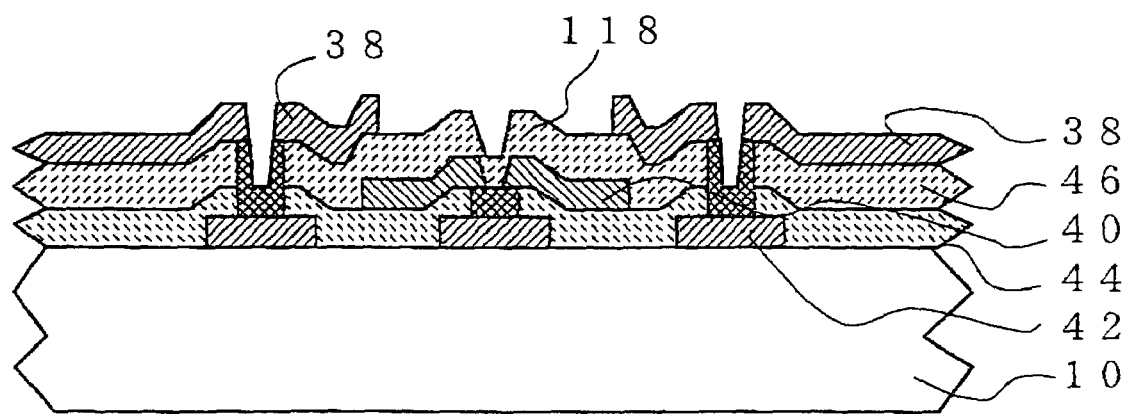
FIG. 14 is a sectional view showing a liquid-crystal optical element according to a tenth embodiment of the invention.

In FIG. 14A (identical to FIG. 4A), the top portion of a ring-shaped segment electrode 40 is covered by an insulator 118 that belongs to a second insulating layer 46. For the drive of the liquid-crystal optical element, the driving voltage can be favorably lowered by removing the insulator 118. Unless the insulator 118 is removed precisely, however, the drive is inevitably adversely affected by the remaining insulator as if there were clearances between the concentrically arranged segment electrodes.

Figure 14B:
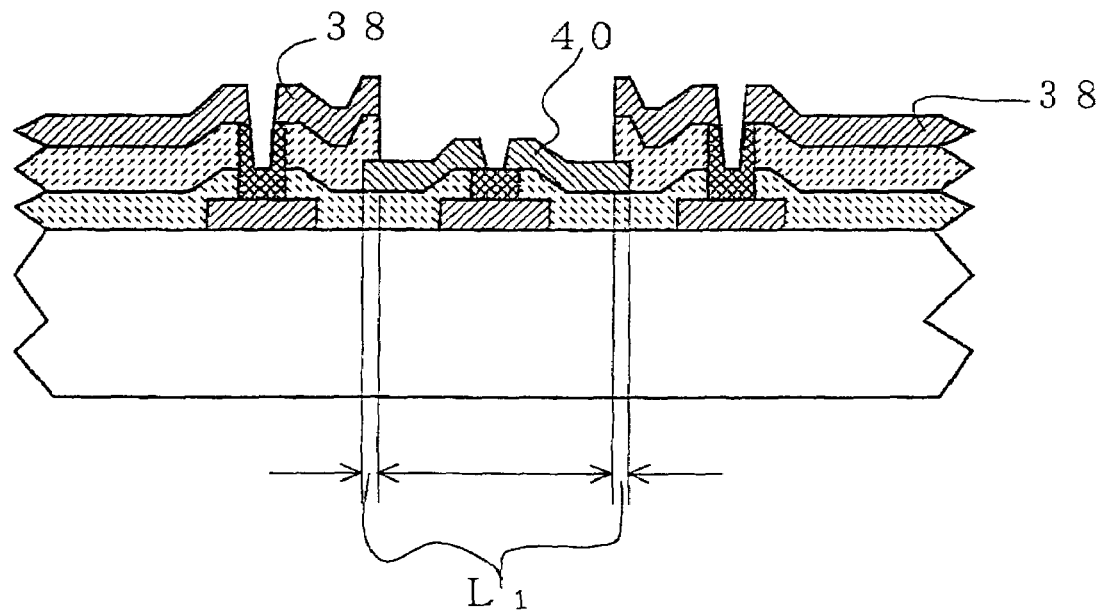

In the present embodiment, as shown in FIG. 14B, an insulating film on the second transparent electrode layer 40 is removed with use of a third transparent electrode layer 38 as a mask. Specifically, the insulating film on the adjacent second segment electrode 40 is removed with use of the segment electrode 38 on the liquid crystal layer side as a mask. When the insulator 118 that belongs to the second insulating layer 46 is removed in this manner, a section can be obtained in which no insulator is left between the concentric segment electrodes that adjoin each other in plan, as shown in FIG. 14B.

In consequence, the segment electrodes on which no insulator is left can apply the driving voltage to control the liquid crystal layer with satisfactory sensitivity. This method can be adopted because the present invention is characterized in that there are no clearances between the adjacent ring-shaped segment electrodes.

If this method is adopted, the etching process can be favorably stabilized by providing each two adjacent ring-shaped segment electrodes with an overlapping portion L1.

A liquid-crystal optical element according to an eleventh embodiment of the present invention will be described with reference to FIG. 15.

Figure 15:
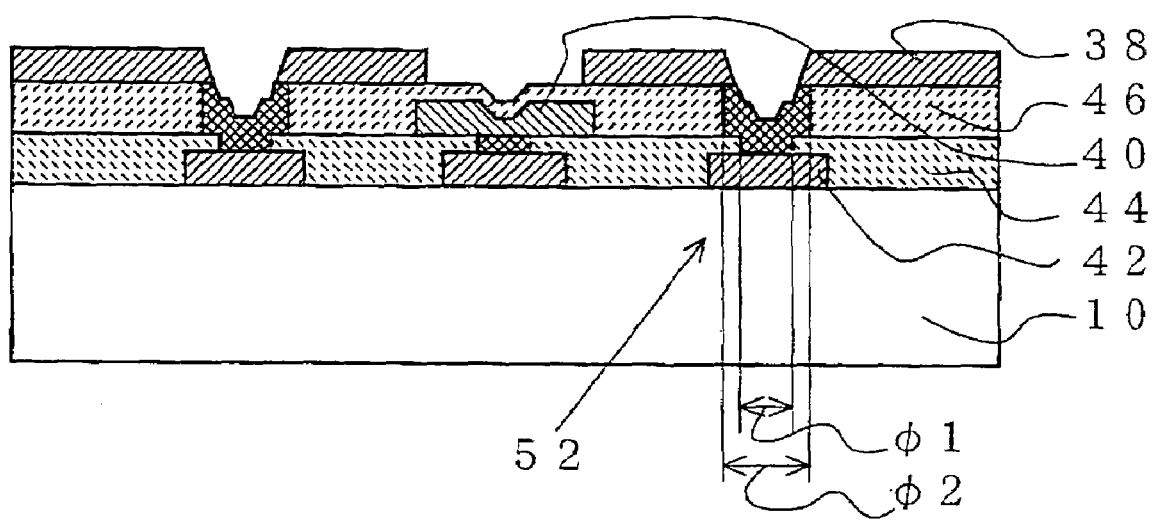
FIG. 15 is a sectional view showing a liquid-crystal optical element according to an eleventh embodiment of the invention.

In a contact portion 52, as shown in FIG. 15, contact is made between ring-shaped segment electrodes on a third transparent electrode layer 38 and wiring electrodes on a first transparent electrode layer 42. In order to make this contact, openings with diameters $\Phi 1$ and $\Phi 2$ are formed in the first and second insulating layers 44 and 46, respectively. The diameter $\Phi 2$ is set to be 1.2 to 1.5 times as large as $\Phi 1$, so that the area of the opening of the second insulating layers 46 is 1.4 to 2.3 times as large as that of the first insulating layers 44. Specifically, the area of the contact hole in the insulating layer 46 on a second transparent electrode layer 40 is not smaller than 1.4 times that of the contact hole in the insulating layer 44 on the first transparent electrode layer 42.

With this arrangement, the inclination of a transparent conductor in the contact portion 52 can be reduced as illustrated. In consequence, the probability of disconnection in the contact portion can be lessened to increase the yield rate.

Further, the camera (not shown) according to the present invention, which uses the liquid-crystal optical element according to the invention, can pick up a distortion-free image and effectively serve for the speedup, miniaturization, weight reduction, and price reduction of a zoom or multi-pixel digital camera, in particular.

Furthermore, an optical pickup device (not shown) according to the present invention, which uses the liquid-crystal optical element according to the invention, can eliminate aberration correction errors and serve as a practicable optical pickup device for high-density recording media based on a blue laser.

A liquid-crystal optical element according to a twelfth embodiment of the present invention will be described with reference to FIGS. 16 to 18B.

Figure 16:
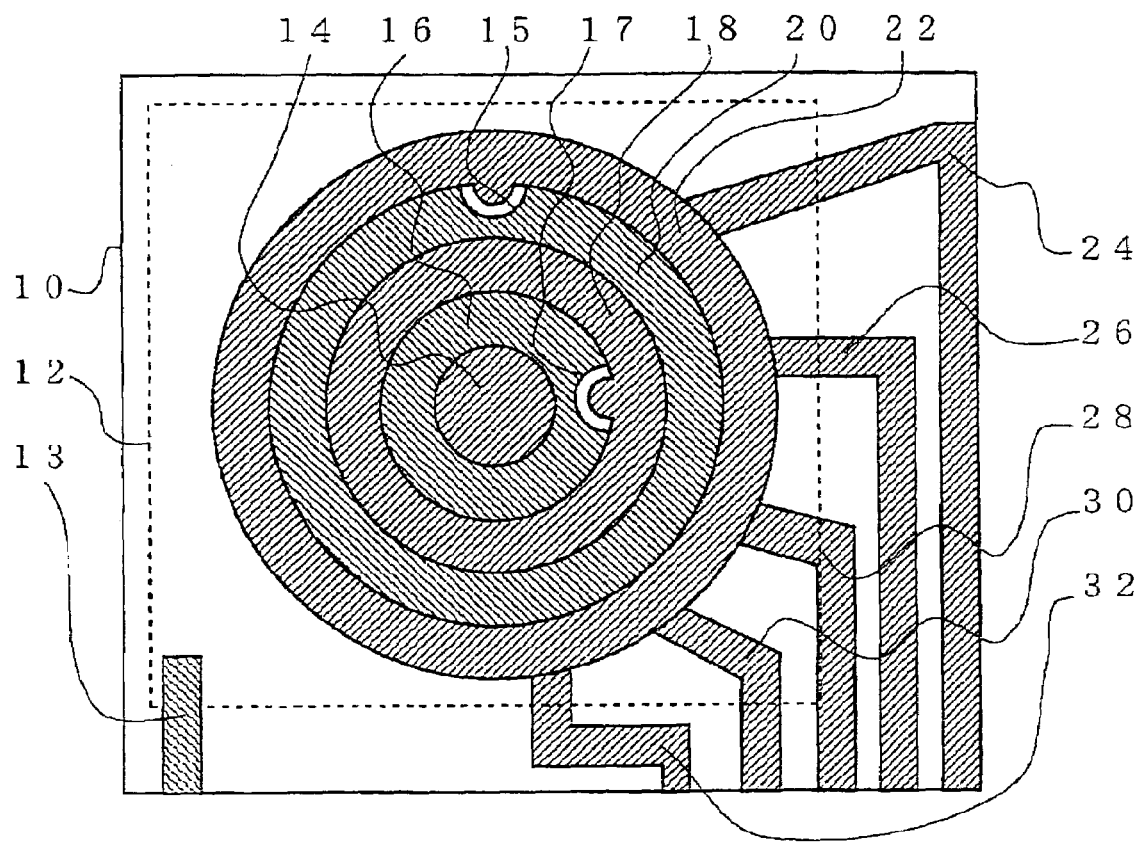
FIG. 16 is a sectional view showing a liquid-crystal optical element according to a twelfth embodiment of the invention.

In the present embodiment, as shown in FIG. 16, recesses 17 and 15 are formed, respectively, in the segment electrodes 16 and 20 on the second transparent electrode layer, out of the ring-shaped segment electrodes 14, 16, 18, 20 and 22 that are arranged concentrically and constitute the liquid-crystal optical element (first embodiment) shown in FIGS. 1A to 1C.

The recesses 17 and 15 are formed, respectively, in the segment electrodes 16 and 20 on the second transparent electrode layer, which is situated nearer to the lower transparent substrate 10 (see FIG. 1C). Even if the diameter of a contact portion is greater than the width of each segment electrode, therefore, the whole surface of the liquid-crystal optical element can be substantially covered by the ring-shaped segment electrodes, when viewed in the direction perpendicular to the plane of the transparent substrates 10 and 12. Accordingly, the entire liquid crystal layer 11 (see FIG. 1C) is controlled by applied voltage from the ring-shaped segment electrodes 14, 16, 18, 20 and 22 that are arranged concentrically.

The electrodes on the lower transparent substrate 10 of the liquid-crystal optical element of FIG. 16 will be described for each of transparent electrode layers 38, 40 and 42 with reference to FIGS. 17A to 17C.

Figure 17A:
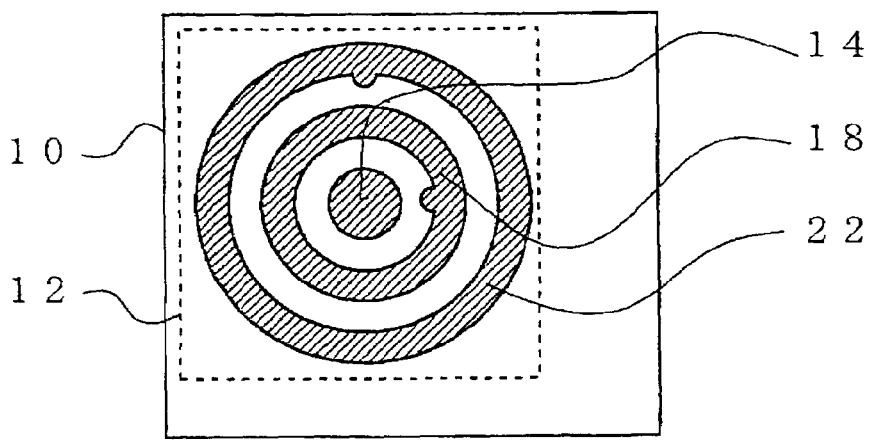
FIGS. 17A and 17B views showing segment electrodes formed on third and second transparent electrode layers of the liquid-crystal optical element shown in FIG. 16.

FIG. 17A shows that an electrode pattern for the odd-number segment electrodes 14, 18 and 22, among the ring-shaped segment electrodes 14, 16, 18, 20 and 22 of FIG. 16 that are arranged concentrically, is formed on the third transparent electrode layer 38. The third transparent electrode layer is a transparent electrode layer on the side of the liquid crystal layer 11. As shown in FIG. 17A, the segment electrodes 18 and 22 have their respective protuberances (at positions corresponding individually to the recesses 17 and 15 of the segment electrodes 16 and 20).

Figure 17B:
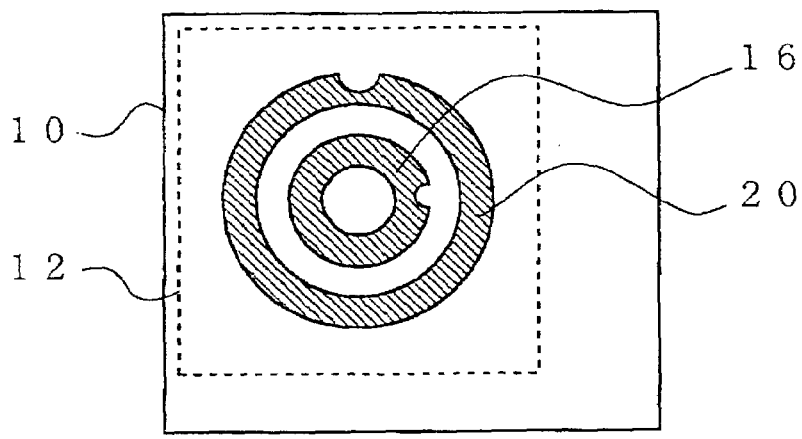

FIG. 17B shows that an electrode pattern for the even-number segment electrodes 16 and 20, among the ring-shaped segment electrodes 14, 16, 18, 20 and 22 of FIG. 16 that are arranged concentrically, is formed on the second transparent electrode layer 40. The second transparent electrode layer 40 is a transparent electrode layer situated nearer to the lower transparent substrate 10 (see FIG. 1C). As shown in FIG. 17B, the segment electrodes 16 and 20 have their respective recesses.

Figure 17C:
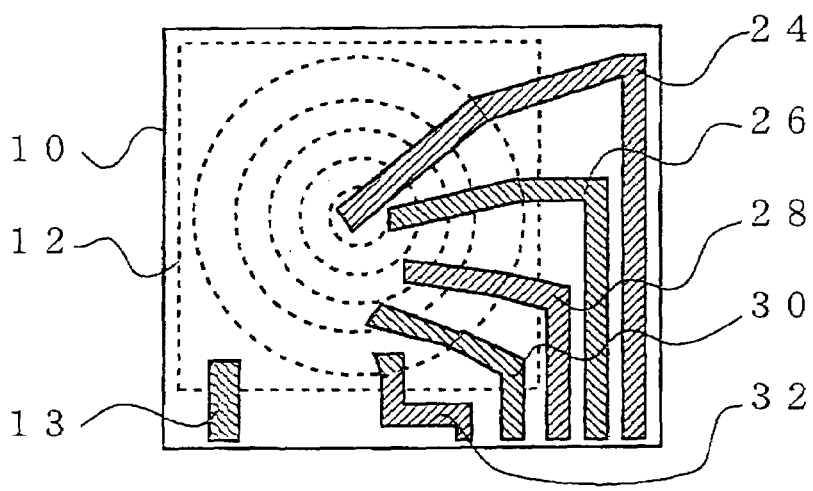
FIG. 17C is a view showing wiring electrodes formed on a first transparent electrode layer of the liquid-crystal optical element.

FIG. 17C shows that an electrode pattern for wiring electrodes 24, 26, 28, 30 and 32 is formed on the first transparent electrode layer 42. As seen from FIG. 17C, the wiring electrodes 24, 26, 28, 30 and 32 are provided in association with the ring-shaped segment electrodes 14, 16, 18, 20 and 22 that are arranged concentrically, respectively. Further, a common terminal electrode 13 for connection with the wholly transparent substrate 34 (see FIG. 1B) on the smaller transparent substrate 12 is provided on the first transparent electrode layer 42.

Electrodes at contact portions between the wiring electrodes 24, 26, 28, 30 and 32 of FIG. 17C and the ring-shaped segment electrodes corresponding thereto are arranged at random in plan, as denoted by numerals 100, 98, 104, 102 and 96 in FIG. 9. By doing this, image distortions can be made unperceivable, as in the case of the embodiment shown in FIG. 9.

Thus, by forming the recesses 15 and 17 in the segment electrodes 16 and 20 that are formed on the second transparent electrode layer which is a transparent electrode layer situated nearer to the lower transparent substrate 10 (see FIG. 1C), the contact portions for the segment electrodes 14, 18 and 22 formed on the third transparent electrode layer on the side of the liquid crystal layer 11 are kept out of contact. By doing this, the whole surface of the liquid-crystal optical element can be substantially covered by the ring-shaped segment electrodes 14, 16, 18, 20 and 22 when viewed in the direction perpendicular to the planes of the transparent substrates 10 and 12 without causing electrical short-circuiting between the segment electrodes.

Figure 18A:
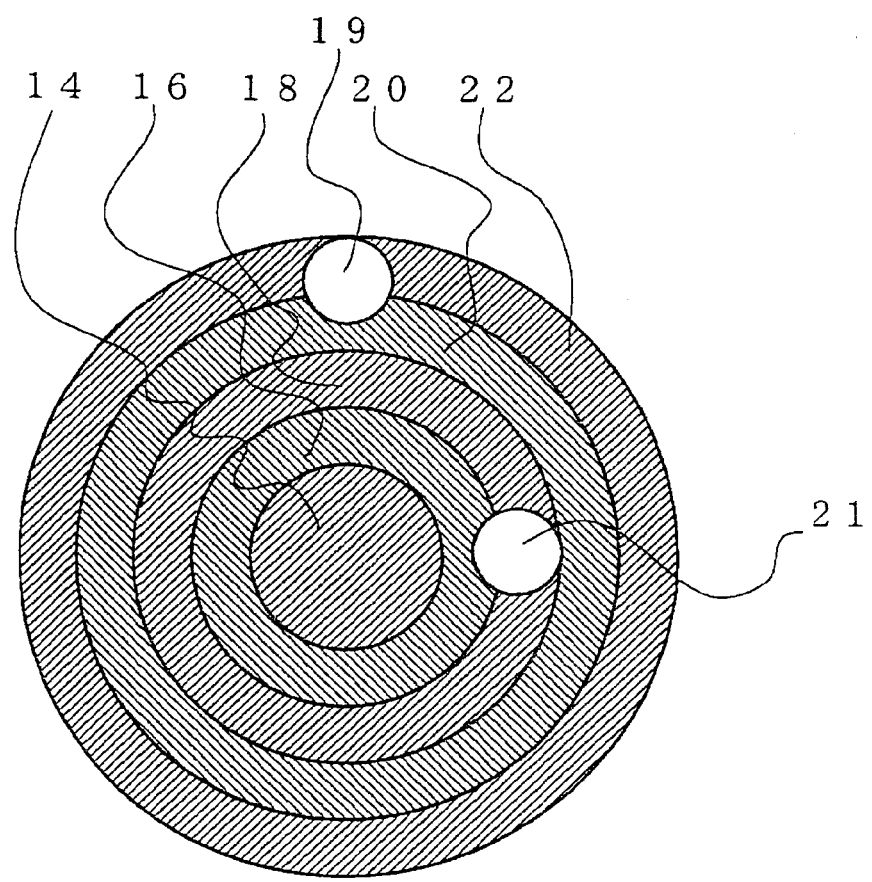
FIG. 18A is a view showing ring-shaped segment electrodes of the liquid-crystal optical element of FIG. 16 arranged concentrically.
Figure 18B:
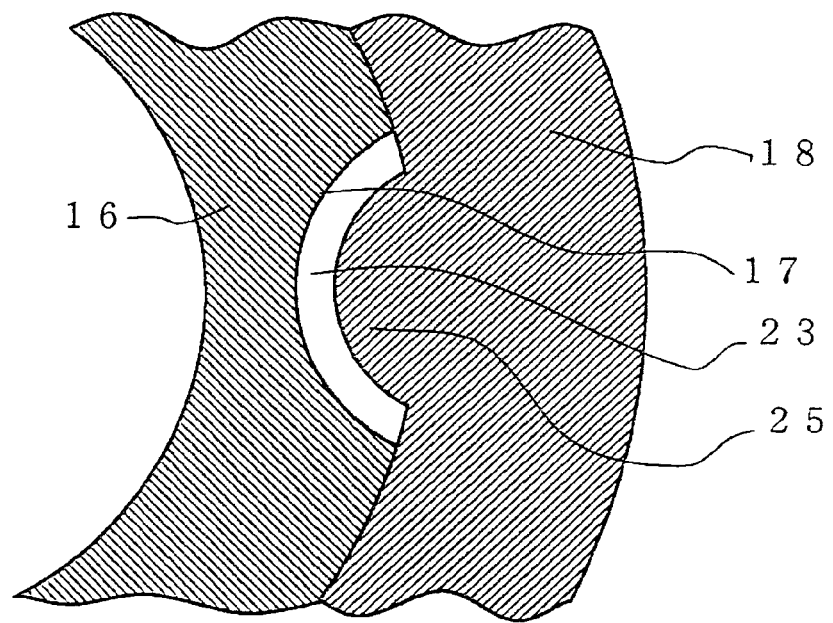
FIG. 18B is an enlarged view showing a region near a contact portion 21 shown in FIG. 18A.
Figure 19A:
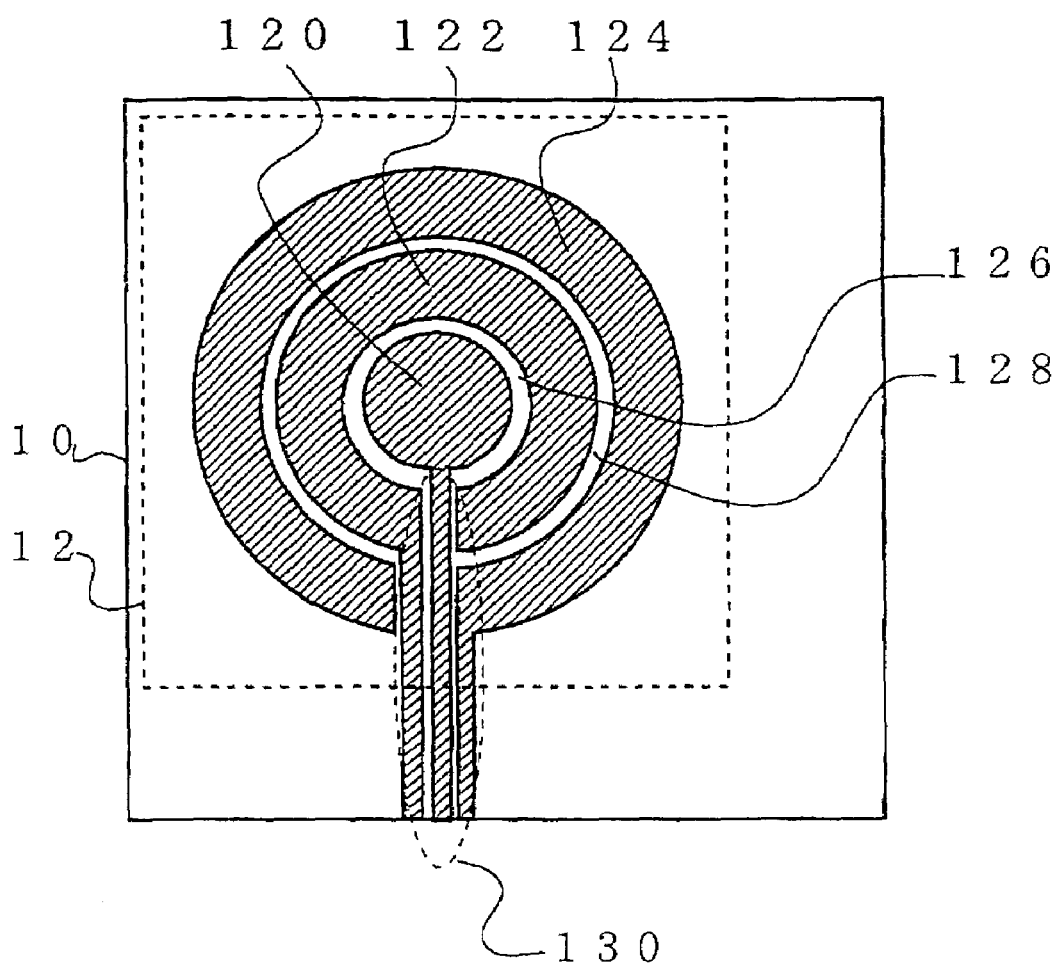
FIGS. 19A and 19B are views showing a conventional liquid-crystal optical element.
Figure 19B:
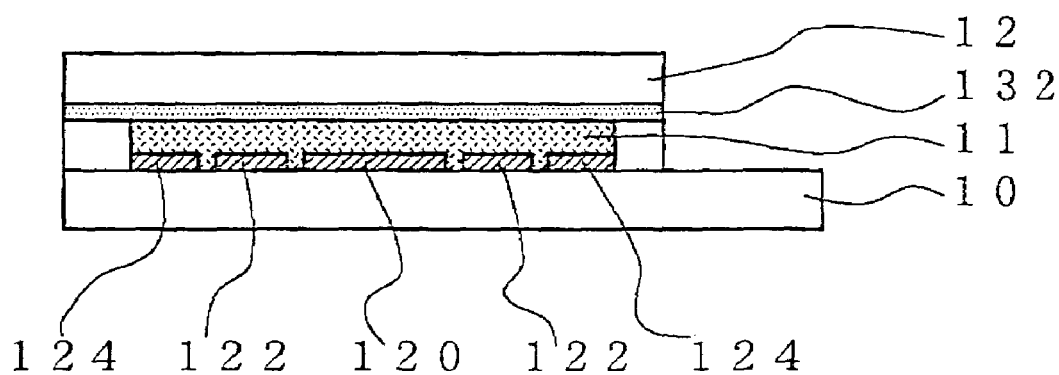

FIG. 18A is a view showing the concentrically arranged ring-shaped segment electrodes of the liquid-crystal optical element of FIG. 16. FIG. 18B is an enlarged view showing a region near a contact portion 21 shown in FIG. 18A.

In FIG. 18A, the odd-number segment electrodes 14, 18 and 22 are electrodes that are located on the third transparent electrode layer 38 (see FIG. 1C), while the even-number segment electrodes 16 and 20 are electrodes that are located on the second transparent electrode layer 40 (see FIG. 1C). The segment electrodes are connected individually to the wiring electrodes 24, 26, 28, 30 and 32 on the first transparent electrode layer 42 (see FIG. 1C) by the contact portions. Conventionally, fewness of the ring-shaped segment electrodes caused no problem, so that the width of each ring-shaped segment electrode was able to be made larger than the diameter of each contact portion. Since the number of pixels of digital cameras and the density of information recording media are increased, however, the number of concentrically arranged ring-shaped electrodes has to be increased, so that the width of each ring-shaped segment electrode is inevitably exceeded by the diameter of each contact portion.

FIG. 18A shows the size of contact portions 21 and 19 between the ring-shaped segment electrodes 18 and 22 and the wiring electrodes 28 and 32. Since the reliability of electrical connection must be secured, it is hard to reduce the size of the contact portions 19 and 21.

The contact portions with which the ring-shaped segment electrodes 14, 18 and 22 on the third transparent electrode layer 38 are connected to the wiring electrodes 24, 28 and 32 on the first transparent electrode layer 42 has to pass through the second transparent electrode layer 40. If the ring-shaped segment electrodes 14, 16, 18, 20 and 22 are arranged without any planar clearances, therefore, the contact portions and the segment electrodes are inevitably electrically shorted. Thus, the whole surface of the liquid-crystal optical element cannot be substantially covered by a plurality of ring-shaped segment electrodes that are arranged concentrically.

FIG. 18B is an enlarged view showing the periphery of the contact portion 21 shown in FIG. 18A. The segment electrode 16 is provided with a recess 17, into which the contact portion of the ring-shaped segment electrode 18 is evacuated. On the other hand, a protuberance 25 based on a contact portion is formed on the segment electrode 18, while a clearance 23 is provided to prevent short-circuiting from the contact portion.

Thus, according to the present embodiment, the recess is formed in a part of the edge of the segment electrode on the substrate side (i.e., segment electrode formed on the second transparent electrode layer 40), among the adjacent concentric segment electrodes. Accordingly, the whole surface of the liquid-crystal optical element except the partial clearance 23 in the periphery of the contact portion can be substantially covered by the ring-shaped segment electrodes.

If the liquid-crystal optical element of this embodiment is used as a camera lens, therefore, it can remove distortion (asymmetry) of an image. If it is used as an aberration correcting optical element, it can eliminate the possibility of an information recording or reproduction error that is attributable to a failure of aberration correction.

What is claimed is:

1. A liquid-crystal optical element comprising:
   a first transparent substrate;
   a second transparent substrate which is located opposite the first transparent substrate with a gap left between the first and second transparent substrates;
   a liquid crystal layer provided between the first and second transparent substrates;
   a plurality of wiring electrodes located in a position at a first height above the first transparent substrate;
   a first group of segment electrodes located in a position at a second height greater than the first height above the first transparent substrate;
   a second group of segment electrodes located in a position at a third height greater than the second height above the first transparent substrate; and
   contact electrodes which connect, in their contact portions, the individual segment electrodes belonging to the first and second segment electrode groups and the wiring electrodes corresponding thereto, wherein
   each of the first and second segment electrode groups is formed of a plurality of concentrically arranged ring-shaped segment electrodes such that one segment electrode belonging to the first segment electrode group adjoins one segment electrode belonging to the second segment electrode group, and
   the contact electrodes are distributed over the first transparent substrate without being concentrated on one straight line when viewed in the direction perpendicular to the planes of the transparent substrates.

2. The liquid-crystal optical element according to claim 1, wherein the segment electrodes belonging to the second segment electrode group are connected to the contact electrodes in positions inside the edges of the segment electrodes.

3. The liquid-crystal optical element according to claim 1, wherein an insulating layer is provided in a center space of the ring-shaped segment electrode belonging to the first segment electrode group, and the thickness of the insulating layer is not less than twice that of the segment electrode.

4. The liquid-crystal optical element according to claim 3, wherein the insulating layer is formed of a plastic film.

5. The liquid-crystal optical element according to claim 3, wherein the first transparent substrate has alignment marks of the same shape formed in the same position using at least two of the layers of the first and second segment electrode groups and the insulating layer.

6. The liquid-crystal optical element according to claim 1, wherein at least one of the first and second transparent substrates are substantially circular.

7. The liquid-crystal optical element according to claim 1, wherein a first insulating layer is formed between the wiring electrodes and the first segment electrode group, a second insulating layer is formed between the first and second segment electrode groups, and an opening is formed in that part of the second insulating layer which corresponds to each said contact portion, and the area of the opening is not less than 1.4 times as large as the area of an opening formed in that part of the first insulating layer which corresponds to each said contact portion.

8. The liquid-crystal optical element according to claim 1, wherein one of the two adjacent segment electrodes, situated on the first transparent substrate side, is formed having a recess in a part of an edge thereof when viewed in the direction perpendicular to the planes of the first and second transparent substrates.

9. The liquid-crystal optical element according to claim 8, wherein the two adjacent ring-shaped segment electrodes are arranged so that there is no planar clearance therebetween.

10. A camera characterized by using the liquid-crystal optical element according to claim 1 as a lens.

11. An optical pickup device characterized by comprising the liquid-crystal optical element according to claim 1.

12. A liquid-crystal optical element comprising:
   a first transparent substrate;
   a second transparent substrate which is located opposite the first transparent substrate with a gap left between the first and second transparent substrates;
   a liquid crystal layer provided between the first and second transparent substrates;
   a plurality of wiring electrodes located in a position at a first height above the first transparent substrate;
   a plurality of ring-shaped segment electrodes arranged concentrically between the liquid crystal layer and the first transparent substrate; and
   contact electrodes which connect the individual segment electrodes and the wiring electrodes corresponding thereto in their contact portions, wherein
   a central segment electrode, among the ring-shaped segment electrodes, is situated in the lowest or highest position above the first transparent substrate so that the segment electrodes situated farther from the central segment electrode are higher or lower above the first transparent substrate, whereby the thickness of the liquid crystal layer is maximized or minimized in the center so that the thickness is gradually reduced or increased from the center toward the outer periphery, and
   the contact electrodes are distributed over the first transparent substrate without being concentrated on one straight line when viewed in the direction perpendicular to the plane of the first transparent substrate.

* * * * *